United States Patent [19]

Feygin

[11] Patent Number: 5,354,414

[45] Date of Patent: * Oct. 11, 1994

[54] APPARATUS AND METHOD FOR FORMING AN INTEGRAL OBJECT FROM LAMINATIONS

[76] Inventor: Michael Feygin, 2301 205th St., Suite 107, Torrance, Calif. 90501

[*] Notice: The portion of the term of this patent subsequent to Jun. 21, 2005 has been disclaimed.

[21] Appl. No.: 671,720

[22] Filed: Apr. 4, 1991

Related U.S. Application Data

[63] Continuation-in-part of Ser. No. 253,845, Oct. 5, 1988, abandoned.

[51] Int. Cl.⁵ .................. B32B 31/00; B27N 3/00; B23K 9/00; B29C 67/00
[52] U.S. Cl. ............................. 156/630; 156/643; 156/58; 156/245; 156/272.8; 156/273.3; 156/275.5; 156/380.9; 156/381; 156/538; 156/267; 219/121.65; 219/121.66; 219/121.8; 264/25; 264/113; 264/125; 264/126
[58] Field of Search ............. 156/60, 344, 283, 272.2, 156/272.8, 643, 250, 629–632, 320, 321, 284–285, 155, 267, 273.3, 273.5, 273.7, 256, 356, 263, 242, 245, 275.5, 283, 286, 307.5, 379.8, 367, 364, 556, 538, 541, 567, 257, 62.2, 275.1, 275.3, 272.4, 277, 629, 268, 229, 358, 529, 58, 380.9, 381, 517, 387, 388, 362; 219/121.65, 121.66, 121.8; 264/25, 113, 125, 126

[56] References Cited

U.S. PATENT DOCUMENTS

| | | | |
|---|---|---|---|
| 3,932,923 | 1/1976 | DiMatteo . | |
| 4,196,737 | 4/1980 | Bevilacqua | 128/798 |
| 4,323,756 | 4/1982 | Brown et al. | 219/121.66 |
| 4,361,262 | 11/1982 | Israeli | 228/118 |
| 4,575,330 | 3/1986 | Hull . | |
| 4,752,352 | 6/1988 | Feygin | 264/241 X |
| 4,814,296 | 3/1989 | Jedlicka et al. | 437/226 |
| 4,847,137 | 7/1989 | Kellen | 156/275.7 |
| 4,863,538 | 9/1989 | Deckard | 156/272.8 |
| 4,880,486 | 11/1989 | Maeda | 156/275.5 |
| 4,945,203 | 7/1990 | Soodak et al. | 156/272.8 |
| 4,961,154 | 10/1990 | Pomerantz et al. | 425/174.4 X |
| 5,002,854 | 3/1991 | Fan et al. | 425/174.4 X |
| 5,015,312 | 5/1991 | Kinzie . | |
| 5,037,416 | 8/1991 | Allen | 604/385.1 |
| 5,094,935 | 3/1992 | Vassiliou et al. | 156/58 X |
| 5,174,843 | 12/1992 | Natter | 156/275.5 X |

OTHER PUBLICATIONS

Incropera, et al., "Fundamentals of Heat Transfer" John Wiley & Sons, NY 1981 p. 544.
Feygin M., "Laser CIM in 3-D Complex Objects Production," Industrial Laser Review Jun. 1987.
Kunieda et al., "Manufacturing of Laminated Deep Drawing Dies by Laser Beam Cutting," Proceedings of the First International Conference on Tecxhnology of Plasticity Advanced Technology of Plasticity 1984, Val. pp. 520–525.
"Sculpting Parts With Light", Machine Design (Mar. 6, 1986).

Primary Examiner—Chester T. Barry
Attorney, Agent, or Firm—Wood, Phillips, VanSanten, Hoffman & Ertel

[57] ABSTRACT

The present invention generally relates to manufacturing apparatus, method of manufacture, and products manufactured thereby and more particularly to an integral three-dimensional object (6, 15) formed from individually contoured laminations (4, 62) of the same or gradually varying shape, successive laminae of that object being produced out of thin sheet or powder based materials (1, 60) through the cutting, fusing or physiochemical property changing action generated by a computer directed beam (7) of concentrated energy or matter, successive substantially planar laminations (4, 62) of that object (6, 15) being automatically stacked together for step-wise laminar buildup of the desired object (6, 15).

24 Claims, 9 Drawing Sheets

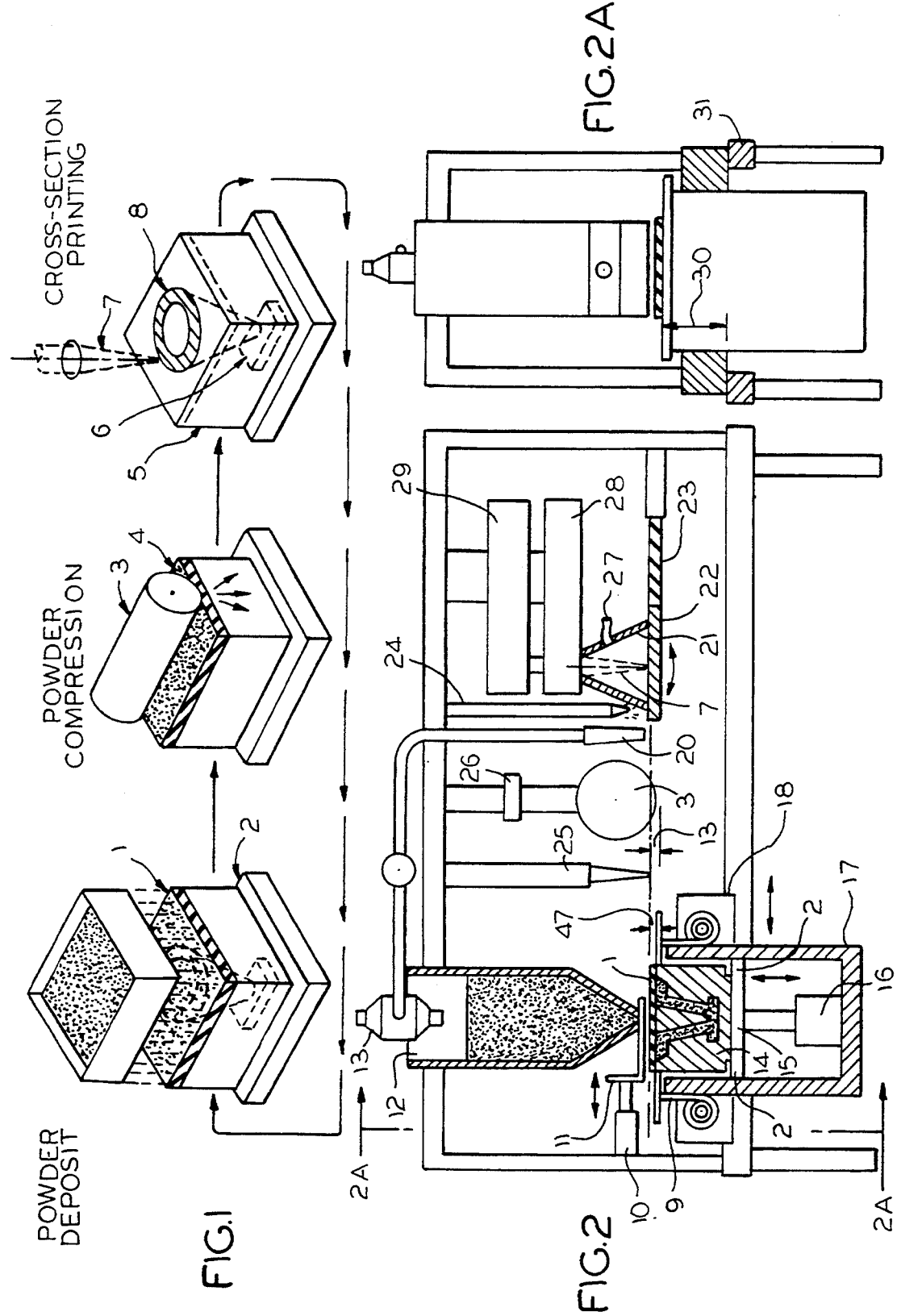

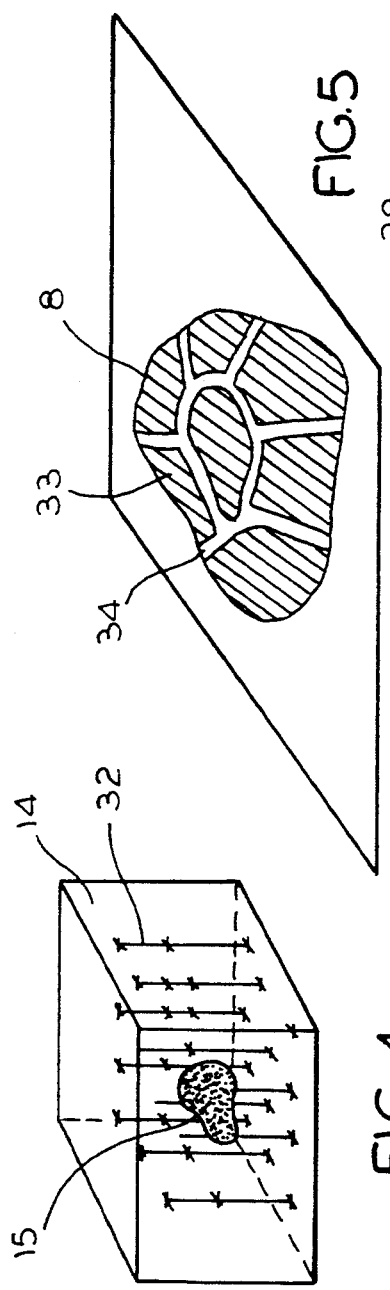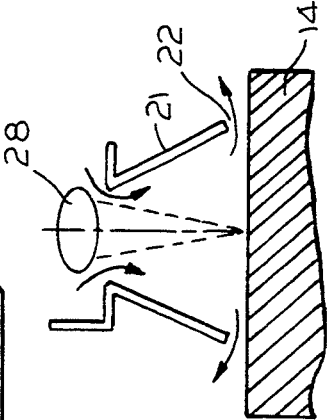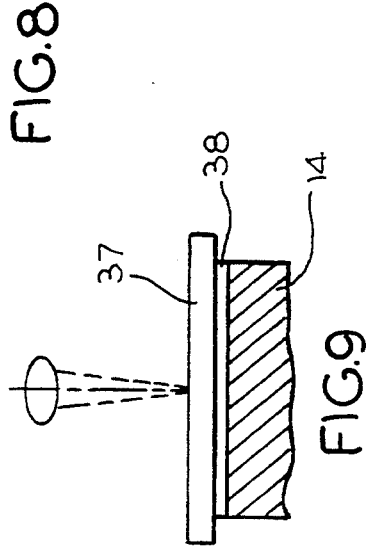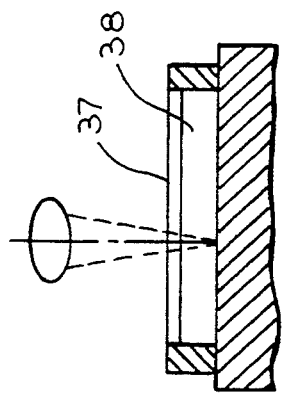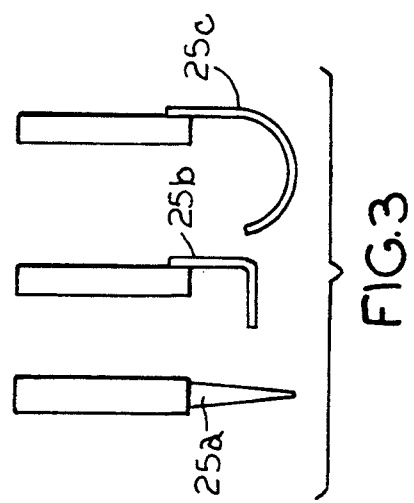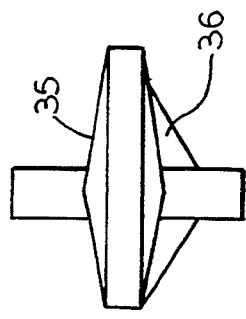

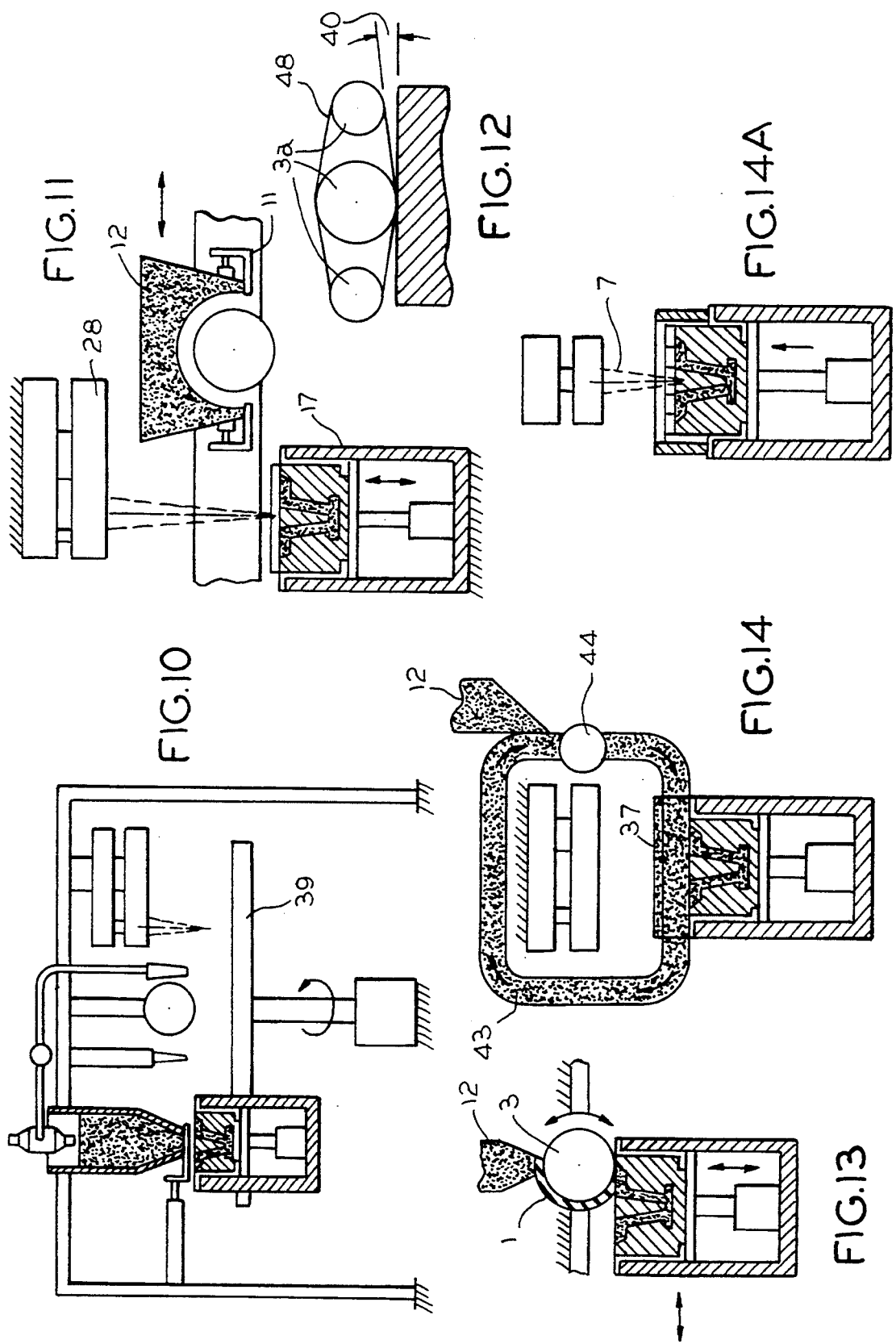

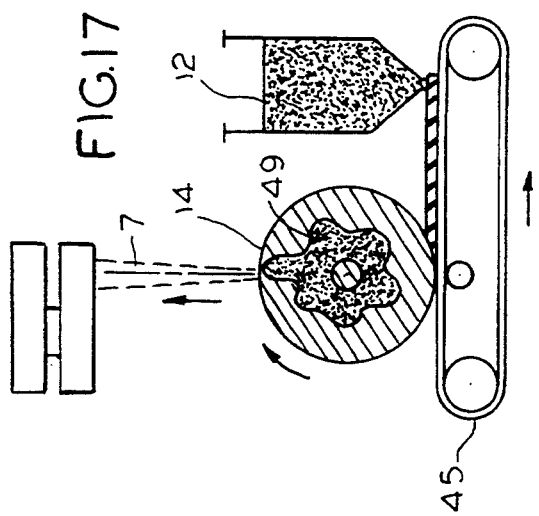
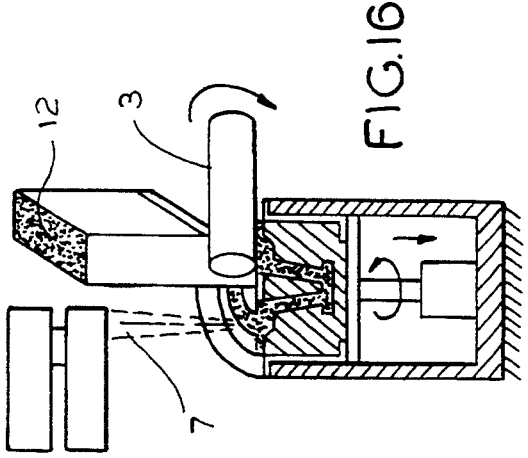
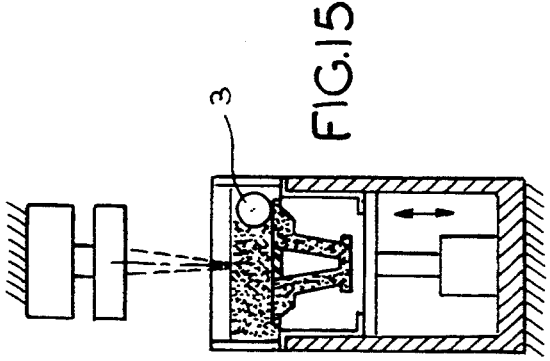
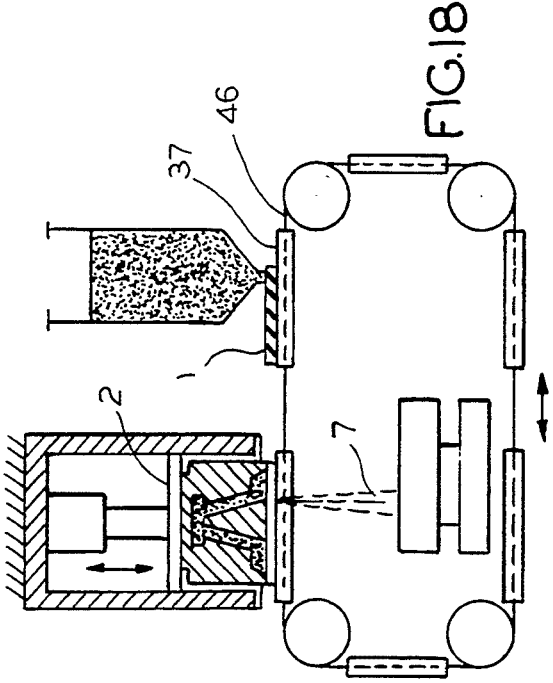
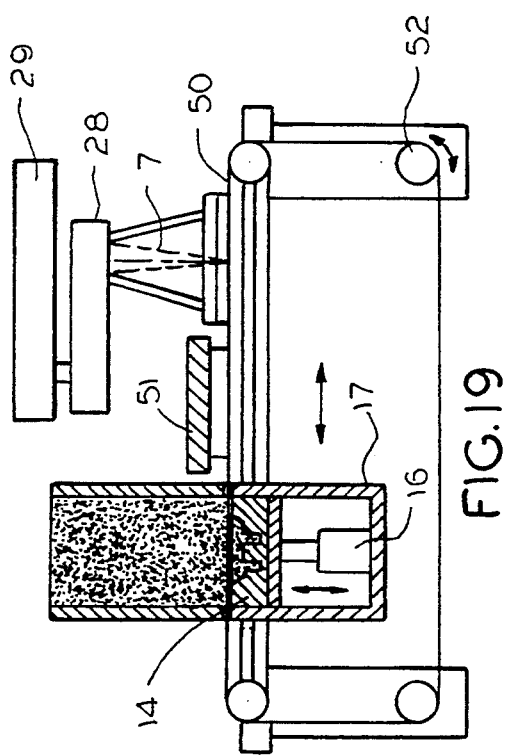

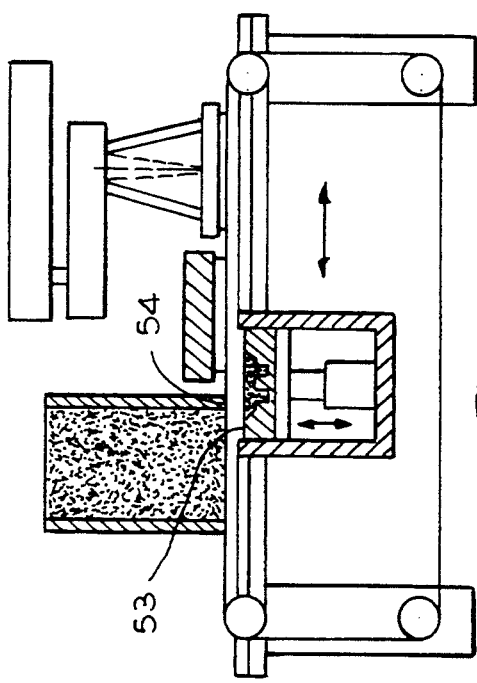
FIG.20
FIG.21
FIG.22
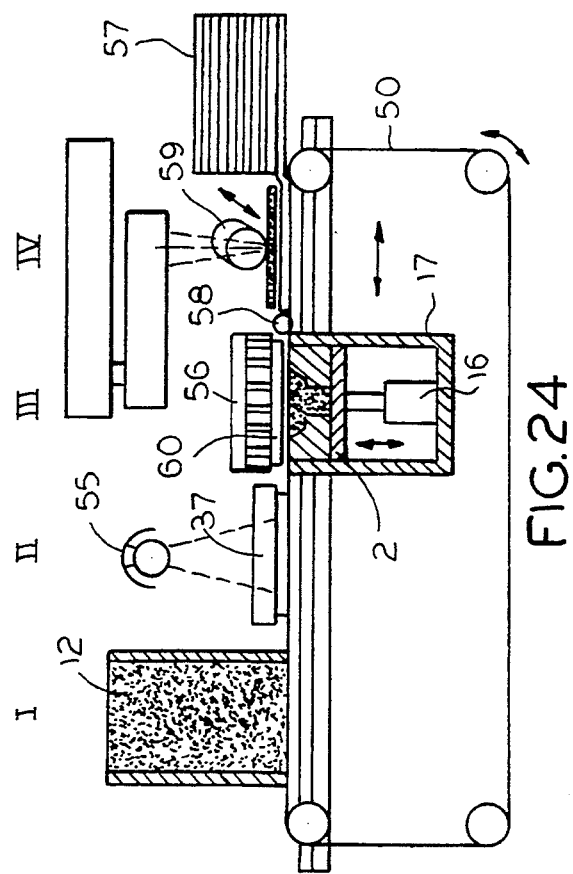
FIG.24
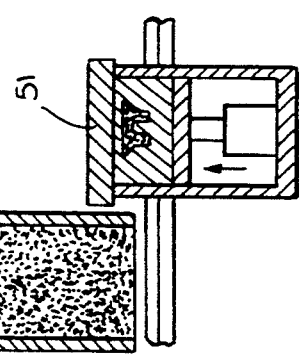
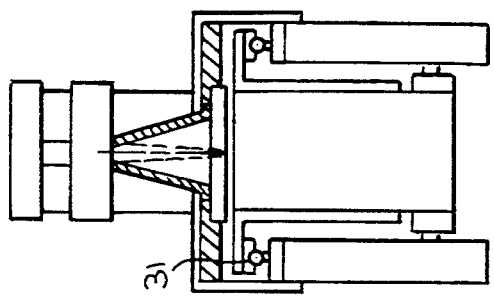
FIG.23
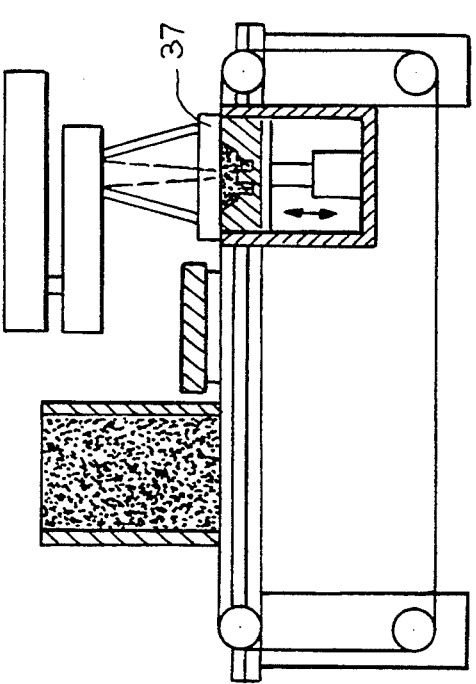

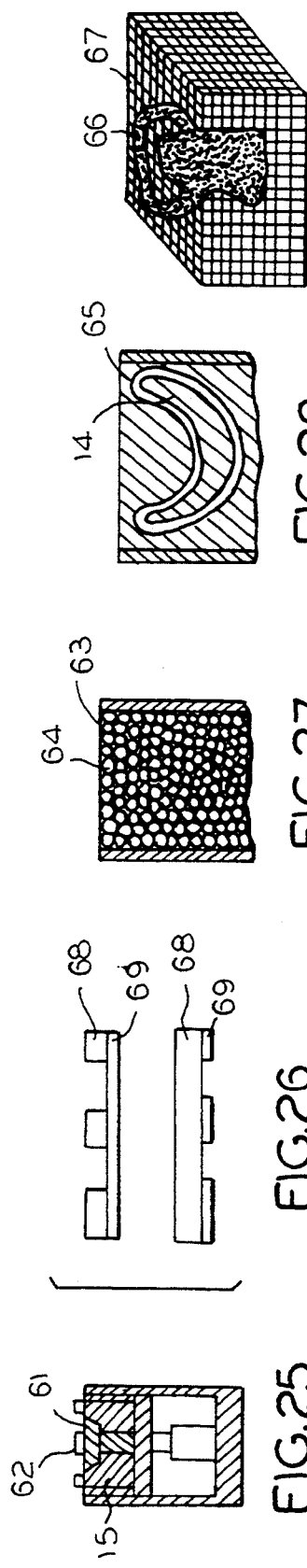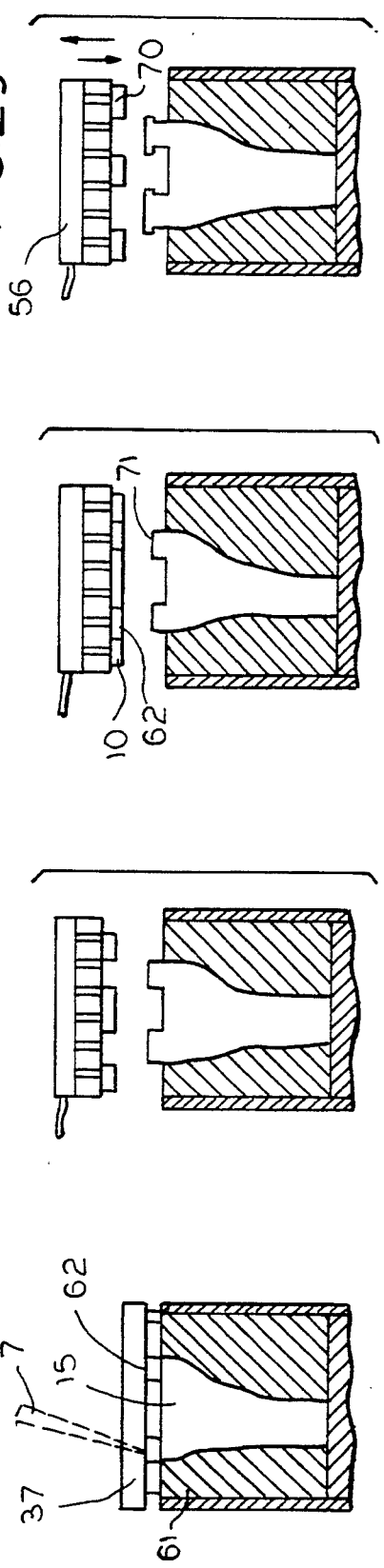

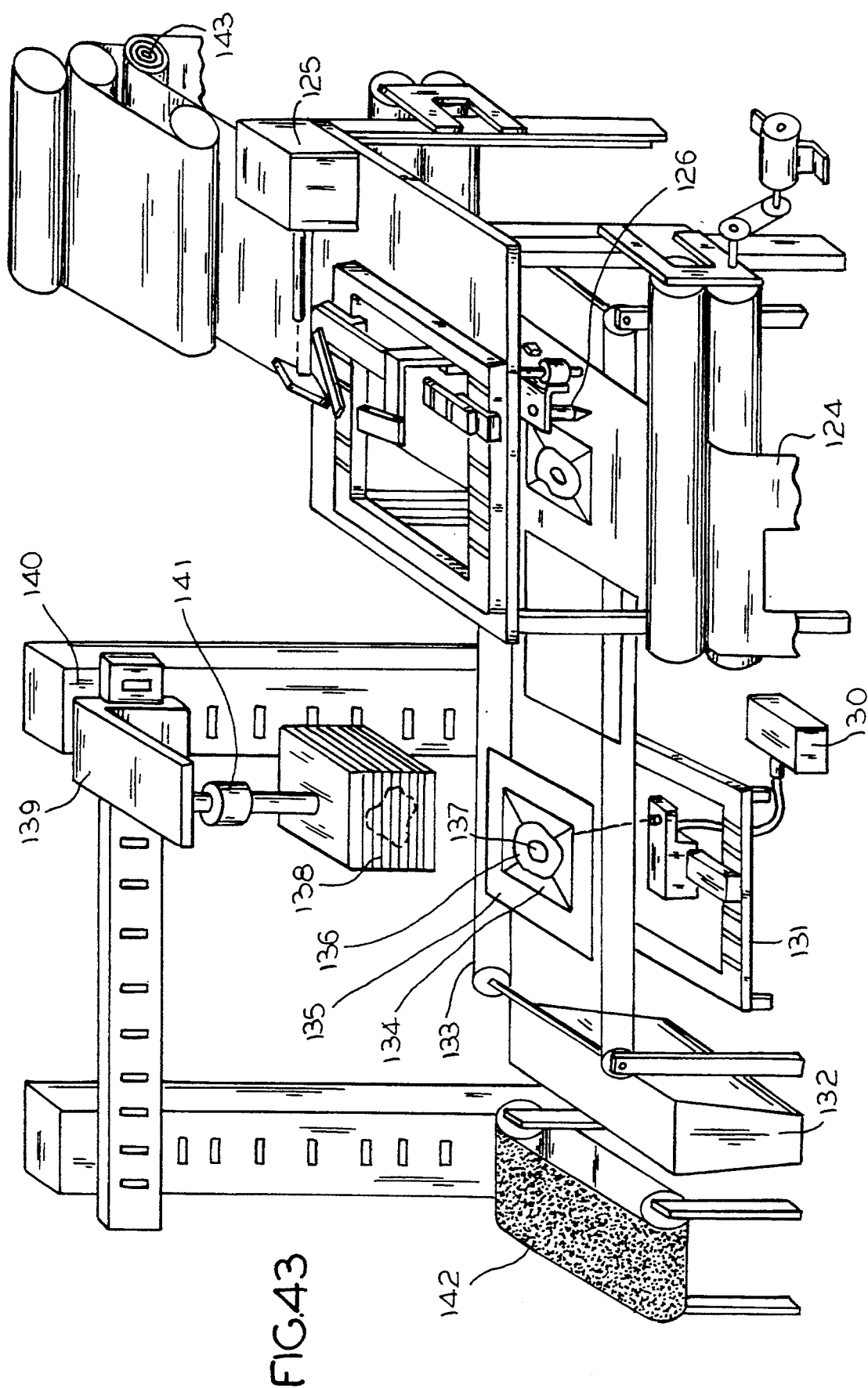

APPARATUS AND METHOD FOR FORMING AN INTEGRAL OBJECT FROM LAMINATIONS

This application is a continuation of PCT/US89/04357 filed Oct. 4, 1989, which is a continuation-in-part of U.S. Ser. No. 253,845 filed Oct. 5, 1988, now abandoned.

TECHNICAL FIELD

This invention relates to the improvements in laminated object manufacturing (LOM) method and apparatus for forming three-dimensional objects out of laminations, and more particularly to the techniques relying on laminations produced out of powder based or sheet materials. The laminated object manufacturing process aims at automated production of metal, plastic, ceramic, and composite parts of unlimited complexity directly form a computer generated image.

BACKGROUND ART

In order to understand the advantages which LOM system offers one has to consider how small batches of parts are usually produced. In conventional manufacturing the part's design is first created using computer aided design (CAD) or other drafting techniques. Later, manufacturing operations are defined and the prototype is painstakingly produced by conventional cutting or forming processes, often requiring skilled labor, considerable time and expense. Multiple tools and machines are used in such production as a rule. After the prototype testing, design changes are likely to occur, and laborious production process has to be repeated until the design is optimized.

Therefore, the ability to manufacture prototypes or small batches of parts directly as a computer output utilizing a single production device is highly desirable. If the modification of the design is needed after the part has been examined, a necessary change can be done on the computer screen and another "hard" copy can be created by the LOM system.

In general, the family of LOM systems proposed herein use laser as a tool for forming laminations and bonding them into a stack. In recent years, flexibility and responsiveness of laser based systems motivated a number of organizations and inventors to apply them in the three-dimensional object production. Several techniques based on two intersecting laser beams selectively solidifying ultra violet (UV) curable liquids at the point of their intersection deep within the liquid medium have been described in U.S. Pat. Nos. 4,041,476, 4,078,229, 4,238,840 and 4,288,861. These systems have suffered from a number of problems related to their resolution, exposure control and difficulties related to synchronous control of two intersecting laser beams.

A more successful process and system has been purposed by Charles W. Hull in U.S. Pat. No. 4,575,330. The stereolithography process described in this patent generates three-dimensional objects by curing a UV curable material with a single laser beam focused on the surface of a platform placed in a vat of a UV curable plastic. As the beam cures a cross-section of the part the platform makes an incremental move down thus exposing another layer of liquid plastic. The beam scans the new surface within the pattern of the desired cross-section solidifying the plastic material within that pattern and attaching it to the previous cross-section. The step is repeated until the desired object is produced.

In spite of a number of advantages gained by this method with respect to earlier technologies the method has a disadvantage of being capable of producing parts out of liquid (mainly UV curable) polymers only. These polymers represent a relatively limited group of materials. They are often toxic. The parts produced through the UV curing process are usually only partially cured and therefore are dimensionally and structurally unstable as they are removed from the vat.

In order to prevent their sinking into the liquid, a substantial support structure has to be designed and built for cross-sections located above the platform and unattached to other cross-sections. The process also suffers from internal stress problems created as a result of a shrinkage caused by the UV curing process within the plastic part. These stresses cause warpage of unsupported or suddenly expanding cross-sections and therefore make it difficult to create certain geometries. Thick walled parts are difficult to create for the same reason. The speed of the process is also limited by the low powers of currently available UV lasers.

Other developments have taken place with the use of powder materials in building near net shape three-dimensional parts. U.S. Pat. No. 4,323,756 of C. Brown, E. Brienan and H. Kear describes a technique for building parts in a layered fashion using high power energy beams to melt substrate surface and added stock. In this technique powder is deposited onto a substrate by blowing a stream of it through a nozzle coaxial with a laser beam heating and melting it along with the substrate as soon as the powder reaches the surface of the substrate. In order to direct the new powder to the desired places of the laminated part either the part or the nozzle have to be moved in a controlled fashion. This method has an obvious disadvantage associated with the necessity to overcome inertia of moving mechanical components. Also, the ability to deposit material in a precise fashion to achieve high resolution in the final product is questionable in this technique, since in order to be deposited the material has to go through a nozzle.

Early concepts related to use of sheet materials in the three-dimensional parts buildup have been explored by Japanese scientists (See: Masonory Kunieda and Takeo Nakagawa "Manufacturing of Laminated Deep Drawing Dies by Laser Beam Cutting", Advanced Technology of Plasticity, Vol. 4 (1984)). Although some methods for laser cutting laminae and joining them together have been described, this work has not suggested ways of using the laminating technique for building a computer driven device which would transfer three-dimensional computer images into physical parts in one automated step.

My earlier U.S. Pat. No. 4,752,352 has suggested a number of methods and systems for accomplishing this goal. The current application relates to significant improvements on the methods and apparatus described in the earlier patent. These apparatus create three-dimensional parts out of substantially planar cross-sections utilizing powder based or sheet materials. The methods overcome the material limitations of the stereolithographical technique by making it possible to use a wide range of powder materials (including metals) as well as many plastic, metal and composite sheet materials for the laminated manufacturing of three-dimensional objects. At the same time they allow to achieve much greater speed and finer resolution than the process disclosed in the Brown et al. '756 patent by avoiding the material deposition through a nozzle, thus, allowing the use of scanning techniques in the energy beam manipulation.

Another type of an automated modelling system based on liquid polymers is being developed by an Israeli company, Cubital (See: Itzhak Pomerantz, "Automated Modeling Machines", NCGA 1989 conference proceedings, Apr. 17–20, 1989). Their system manufactures models out of liquid polymers by a multistep process. The steps of the technique are: deposit a thin layer of a UV curable polymer; illuminate the polymer through a xerographically produced mask having geometry of a single cross-section; suction off the liquid material surrounding the cured cross section; fill the areas surrounding the cross-section with a water soluble UV polymer, water, or wax serving as support; cure the rest of the layer or freeze the water; grind the surface to establish a uniform layer; repeat the earlier steps until the part is complete; thaw the ice, or melt the wax surrounding the part or dissolve the water soluble polymer. The process is very complex but it resolves some geometry problems present in stereolithography. Since the process is based on liquid UV curable polymers it does not resolve material limitations and internal stress and shrinkage problems related to stereolithography.

Still another technique relying on illumination of liquid polymers through a mask is being developed by Efrem Fudim of Light Sculpturing Inc. based in Wisconsin. His U.S. Pat. Nos. 4,752,498 and 4,801,477 describe several techniques which are somewhat similar to the earlier described method being developed by Cubital. These methods usually involve illumination of a UV curable polymer with a UV light through plotter generated masks and a piece of flat material transparent to the UV radiation and remaining in contact with the liquid layer being cured. Although the method is simpler than the Cubital technique and is much more energy efficient than stereolithography it has certain limitations related to unsupported geometries. It also relies on UV curable liquid polymers and, therefore, is limited by the properties (shrinkage, warpage, fragility, strength) and relatively small number of these materials. Still another development similar to my powder based LOM process is taking place at the Desktop Manufacturing Inc. (formerly Nova, Inc.) associated with the University of Texas (Austin). A process called "Selective Laser Sintering" has been under development by this company (See "Desktop Manufacturing" report published by Technical Insights, Inc. in 1988). The technique involves sequential deposition of thin layers of metal or plastic powders and selectively sintering these powders with a scanning laser beam. My work has included conducting an extensive experimental investigation of the powder and sheet LOM processes using a prototype system which I built at John Deere, Inc. Although a significant part of the present patent is dedicated to improvements on the powder technique the current view of the author is that the sheet LOM process may be superior to the powder technique. The powder technique has a serious problem of heat generated internal stresses which distort laminated objects and limit the number of available geometries. Structural properties of parts created out of powder have to date been greatly inferior to the ones created out of sheet.

One more computer automated manufacturing technology related to the presently described development is sometimes called "Ballistic Particle Manufacturing". This is a dot matrix printer like technique for creating 3-D parts (U.S. Pat. No. 4,665,492). In this method particles of molten material are deposited in a controlled fashion to create a three-dimensional part. This method is expected to have some problems related to internal stress and low resolution.

It is presently believed that the sheet based LOM method is the best proprietary technology among the ones described earlier. The majority of the related technologies are based on one or another form of a UV curable technique, Only one other process is related to the fusion of powders with lasers. None of them is based on sheet materials. Advantages of the sheet LOM process as compared to the ones described earlier are as follows:

1) The main competitive advantage of the sheet LOM process is in its ability to make parts out of far more off-the-shelf materials than UV curing techniques. My work has already resulted in the production of parts out of metal, plastic, and paper. The paper based parts have properties similar to plywood.
2) Internal stress is a very serious problem in the stereolithography, Selective Laser Sintering (SLS), and Cubital (Instant Slice Curing) processes. The sheet LOM process produces virtually no internal stress.
3) The sheet technique is much faster than stereolithography or the powder LOM processes. The reasons are as follows:
    a) Due to the high viscosity of UV liquids it takes a considerable amount of time to form a layer (even with the newly introduced wiper blade leveling the liquid). Although the curing step is faster in the Cubital process than that of stereolithography a considerable amount of time is required to perform other steps of this multi step technique. Deposition of a sheet in the LOM process can be virtually instantaneous.
    b) Because of the fact that during the execution of the sheet process the laser beam outlines the periphery of a cross-section instead of raster painting its complete area as is done in UV or powder processes thin walls are produced just as fast as thick ones. The only factor that matters is the periphery of a cross-section. Therefore, extremely large parts with thick walls (even ones which would be difficult to mold or cast) can be produced by this technique.
4) Model production has been chosen as an initial market by many in the field, since UV curable parts created by the 3-D Systems stereolithography process or Cubital's "Instant Slice Curing" technique are rather fragile and can not serve as functional parts yet. By creating several metal and plywood objects my work on the LOM process has demonstrated a clear potential to produce functional parts such as dies, molds, and production parts directly. So far there has not been any proof that laser beam scanning is a good way of producing structurally strong materials (when a laser beam scans a UV or powder cross section it creates the material out of which it will be made). On the other hand the LOM technique just outlines the geometry of a cross section by cutting it around its periphery. This preserves the original properties of the sheet material which has been earlier created by an extrusion, cold or hot rolling, or plastic film production processes.
5) Because of the absence of internal stresses in the sheet LOM technique and the unpredictable shrinkage of parts associated with it there is a potential of manufacturing objects with the XY direction tolerances significantly higher than with internal stress affected techniques.

6) Processes relying on manufacturing out of UV curing polymers have been subject to strict OSHA scrutiny since they involve potentially harmful substances. The majority of sheet materials used in LOM process are considered safe.

7) Although virtually no waste is generated in the UV curing technique the liquid polymers used in it are extremely expensive. Most of the sheet materials are over an order of magnitude cheaper.

8) Due to being a one step process (not requiring post curing operations), and because of high speed of production and lack of internal stresses the sheet LOM process is expected to produce extremely large parts just as efficiently as tiny ones.

9) The only process besides LOM which is capable of automated creation of unsupported (cantilever) geometries of unrestricted complexity is the one being developed by Cubital. However, their process is significantly more complex than the sheet LOM technique.

DISCLOSURE OF INVENTION

In general terms, the present invention provides a new and improved method and apparatus for manufacturing a three-dimensional object from laminations formed in shapes required for assembly in a preselected sequence. The apparatus contains means for storing and supplying a material together with means for forming the material into a plurality of individually contoured laminations. The lamination forming means are comprised of a beam of concentrated energy or a jet of concentrated matter. It also includes computer based means for defining the geometry of the laminations and for controlling the operation of lamination forming means. It further includes means for assembling the plurality of individually contoured laminations into a three-dimensional object and for integrally bonding each of the individually contoured-laminations. With the unique apparatus of the invention, the formation of an integral three-dimensional object from laminations of the same or gradually varying shape can be successfully accomplished.

The process starts from creating a computer image of an object using available Computer Aided Design techniques. Later, the image is cross-sectioned with the use of the computer into multiple cross-sections located at a predetermined distance from each other.

In a presently preferred embodiment, by way of example and not necessarily by way of limitation, a supply station houses a powder based material container located at the material depositing station. The apparatus also includes a cyclically travelling carriage which in the preferred embodiment moves reciprocally. The carriage carries a vertical stage with a laminations carrying platform located on it. The piston-like platform which is surrounded by a cylinder-like enclosure makes incremental moves down as thin powder layers are deposited onto it from the powder container. After each new layer of the powder is deposited it may be compressed on the platform through an action of a roller or a press. At this stage the geometrical information about the cross-sections of a three-dimensional object being manufactured is transmitted from the computer, where it was defined through computer aided design means, to a laser scanner which scans the newly deposited layer of powder with a focused laser beam. The powder affected by the laser beam changes its physical or chemical properties. Most often this change results in sintering or melting of the powder and fusing the material within the boundaries of a cross-section as well as bonding it to the previous cross-section. After all of the cross-sections have been created by the apparatus this change in property is utilized in separating the material which belongs to the object from the material which surrounds it. The means for accomplishing this separation can be either mechanical such as blow off, impact, vibration or sand blasting, or chemical such as solution in a chemical media which affects the surrounding material without damaging the object.

A number of variations which are possible in the powder based LOM process and apparatus are discussed in the present invention. Different powder based materials, changing the sequence of process steps or omitting some of them altogether, different types of concentrated energy or matter means, different ways of introducing the change of property into the powder, and different ways of utilizing it in the object separation process, possibility of using cover gasses and liquids, and a variety of post processing techniques are considered.

The most significant limitation of the process is the shrinkage resulting from the internal stresses introduced into the object during the lamination forming step. This problem can be overcome by creating thin walled boundaries encapsulating the material of the object during the laminating process and then postprocessing the object in a furnace. A variety of other methods capable of reducing the effect of the problem on the dimensional properties of the LOM created object are discussed. A number of details related to different elements of the LOM apparatus are discussed in the present invention. Ways of achieving desired thickness of powder layers, different methods of depositing these layers, a variety of ways for moving the platform (linear stage, rotary table, conveyor, etc.), methods of compressing the powder and scanning its surface with an energy beam are considered.

In another embodiment, a supply station houses sheets of thin sheet material. These sheets are sequentially fed into the system by a sheet feeder and then are transferred to a laminations forming station where they are cut in the pattern of a desired cross-section by a laser beam manipulated by a positioning table or a scanner. The cutting can be accomplished through traversing the laser beam around the periphery of a cross-section in a plotter-like manner or by removing the material in the areas surrounding a cross-section by a raster scanning process performed in a laser printer-like manner. Later, if necessary, laminations are separated from the surrounding material and are transported to the stacking device where they are attached to the stack through adhesion, welding, or diffusion bonding techniques.

An improved method of production of a part by the sheet LOM process relies on a different sequence of steps in the LOM cycle. In that method, the attachment of the sheet material to the laminated stack is done first. Then it is followed by a forming step which is performed by a laser beam cutting the material to the depth of one lamination. The attachment can be performed either over the whole area of the laminated layer or selectively within the boundary of the cross-section. In the case of selective attachment the same or another laser beam can be used for welding the cross-section to the stack prior to the cutting. A printed image of a negative of a cross-section produced on the sheet material itself or on an overlaying sheet can also be used as a mask in conjunction with a UV curing technique to selectively bond a cross-section to the laminated stack.

The possibility of using multilayered sheet materials, different methods of separating the extra material from desired laminations possibility of combining laser cutting and chemical etching processes in the lamination forming step and other apparatus improvement possibilities are suggested.

Also considered is a possibility of combining certain features of powder and sheet based LOM techniques into a single device. This device will be capable of performing both powder and sheet based processes separately or simultaneously. The need in such device is caused by the desire to combine advantages of each method. On the one hand the sheet process is affected by heat caused warpage to a much lesser degree than the powder one. On the other hand noncontiguous contours may be a problem in some geometries created by the sheet technique while in the powder technique they are always supported by the surrounding powder. The possibility of filling the spaces created in the laser formed sheet cross-sections with a curable liquid plastic material are also discussed in the description of this version of the LOM apparatus.

The method and apparatus of the present invention has many advantages over currently used methods and apparatus for producing small batches of parts. The designer can work directly with the computer using the LOM system interactively for creating prototypes and verifying his concepts. Dies and molds can be manufactured inexpensively by the LOM apparatus. Highly complex metal matrix or composite parts can be produced for automobile and aerospace industries. Three dimensional maps can be produced for civilian and military applications. Artificial bone implants and prosthesis custom fitting individual patients can be created for medical applications. Optical lenses with complex surfaces can be investment cast from the patterns created by LOM technique. EDM and ECM dies, wing tunnel models, molecular models, and even art objects can be produced.

Parts of unlimited complexity including those with sculptured surfaces, voids or intricate channels can be manufactured. No mills, drills or cutters are required. Production is accomplished using one machine which uses one tool—the laser. Setup time for different parts produced out of the same material is cut virtually to zero. It is no longer necessary to plan manufacturing procedures since parts are produced directly from computer generated images without involvement of the operator. Production cycles for complex parts can be reduced from weeks to minutes. Costs and use of skilled labor can be cut dramatically, The above and other advantages of this invention will be apparent from the following more detailed description when taken in conjunction with the accompanying drawings of the illustrative embodiments.

BRIEF DESCRIPTION OF DRAWINGS

FIG. 1 is a diagram illustrating different steps of the LOM process including powder deposition, powder compression, and cross-section forming;

FIG. 2 and FIG. 2A are a cross-sectional view of the apparatus for forming three-dimensional objects using the powder based version of the present invention and a reciprocating carriage concept for moving the laminations carrying platform;

FIG. 3 is a plan view of scrapers used in the powder leveling step;

FIG. 4 is a perspective view of a part created by the powder LOM technique surrounded by extra material and supported by a support network;

FIG. 5 is a perspective view of a lamination divided into a number of smaller portions in order to control internal stresses within the part during the laminating process;

FIG. 6 is a planar view of a product part containing support ribs in order to control internal deformations within the part during the laminating process;

FIG. 7 is a cross-sectional view of the stack of powder laminations with a cover gas or liquid channeled over its surface through an enclosure with the surface transparent to the laser light;

FIG. 8 is a cross-sectional view of the stack of powder laminations with a cover gas or liquid channeled over its surface through an enclosure extending from the energy beam directing device to the surface of the laminate;

FIG. 9 is a cross-sectional view illustrating a laser compaction technique for changing properties of the powder;

FIG. 10 is a cross-sectional view of the apparatus for forming three-dimensional objects using a powder based version of the present invention and a rotary table concept for moving the laminations carrying platform;

FIG. 11 is a cross-sectional view of the powder based LOM apparatus utilizing the concept of a powder depositing device moving relatively to a stationary laminations carrying platform;

FIG. 12 is a cross-sectional view of a system of powder compressing rollers connected with a ribbon;

FIG. 13 is a cross-sectional view of a magnetically or electrostatically charged roller depositing a powder layer onto a platform and compressing it at the same time;

FIG. 14 and FIG. 14A are a cross-sectional views from two directions of a powder based LOM system utilizing a steam of circulating powder during the powder deposition step;

FIG. 15 is a cross-sectional view of a powder based LOM system utilizing a steam of circulating powder and a moving roller during the powder deposition step;

FIG. 16 is a cross-sectional view of a powder based LOM system utilizing the concept of simultaneous and continuous powder deposition, compression, and energy beam scanning, with the material deposited on the flat surface of a cylindrically shaped laminate;

FIG. 17 is a cross-sectional view of a powder based LOM system utilizing the concept of simultaneous and continuous powder deposition, compression, and energy beam scanning, with the material deposited on the cylindrical surface of a cylindrically shaped laminate;

FIG. 18 is a cross-sectional view of a powder based LOM system utilizing the concept of the powder being, first, deposited onto plates of a conveyor and, then, compressed against the stack of powder laminations in order to become attached to the stack;

FIG. 19 is a cross-sectional front view of a powder based LOM system illustrating the method of powder deposition onto the laminations carrying platform by direct contact of powder in the powder container and the upper layer of the laminate;

FIG. 20 is a cross-sectional side view of a powder based LOM system illustrating the method of powder deposition onto the laminations carrying platform by direct contact of powder in the powder container and the upper layer of the laminate;

FIG. 21 is a cross-sectional view of a powder based LOM system demonstrating a method of powder compression by pressing the upper layer of the laminate against a stationary flat platform achieved by elevating the linear stage on which the laminate is located;

FIG. 22 is a cross-sectional view of a powder based LOM system illustrating the method of forming a thin layer of powder on the upper surface of the powder laminate by slicing that layer with the lower edge of powder container as the laminate moves relatively to it;

FIG. 23 is a cross-sectional view of a powder based LOM system illustrating a lamination forming operation accomplished by selectively changing a property of the powder layer pressing against a transparent flat window with the laser beam shining through that window;

FIG. 24 is a cross-sectional view of a sheet based LOM system illustrating the possibility of combining the powder and sheet LOM processes into one system;

FIG. 25 is a cross-sectional view of a stack of sheet laminate on a vertically movable platform with a noncontiguous portion of a lamination supported by a flowable material deposited from the powder container of the combined sheet-powder LOM apparatus and filling the empty spaces within the formed sheet laminations;

FIG. 26 is a cross-sectional view of multilayered sheet material used in the laminating process, where either primary thicker layer or secondary thinner layer is ablatively removed during the laminations forming step;

FIG. 27 is a cross-sectional view of a powder based material with spaces between particles filled with a liquid of powder bonding agent used for bonding powder during laminations foaming step of the powder process;

FIG. 28 is a cross-sectional view of a part formed by the powder encapsulation technique used to avoid warpage and deformation resulting from the energy beam heat effect;

FIG. 29 is a perspective view of a sheet laminate in which the extra material surrounding individually formed laminations is not removed during the laminating process, instead, it is cut in a cross hatching fission into multiple small portions easily removable after the laminating process is complete;

FIG. 30 and 31 are cross-sectional views of a sheet laminate located on the laminations carrying platform where desired portions of a lamination are attached to the stack by an action of the laser beam and the extra ones are removed by a vacuum suction plate;

FIG. 32 and FIG. 32A are a cross-sectional view of a sheet laminate illustrating the possibility of attaching desired portions of a lamination by pressing previous lamination against an adhesive coated and cut new ones;

FIG. 33 is a perspective view of an ablatively formed lamination;

FIG. 34 is a perspective view of a periphery cut lamination;

FIG. 43 is a perspective view of a cut-off-the stack LOM system.

BEST MODE FOR CARRYING OUT THE INVENTION

Figure 35:
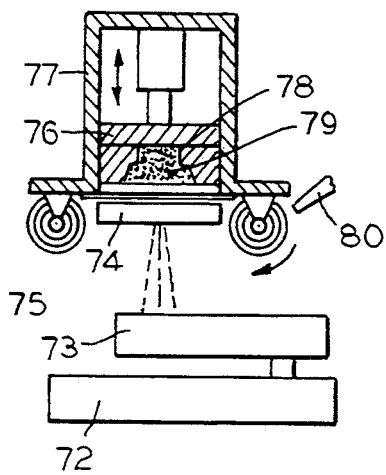
FIG. 35 is a cross-sectional view of a cut-on-the-stack sheet LOM system capable of selectively attaching cross-sectional layers of a part to the laminated stack and automated removal of cut off material.

Instead of cutting extra material out of a raw stock, like it is done in traditional machining methods, the laminated object manufacturing (LOM) system builds the part by adding material to it in a controlled fashion. First, the image of a part is created on the computer screen with the use of a modern computer aided design software. Next, the image is automatically sliced by the computer into very thin cross-sections located 0.001"–0.030" from each other.

Two major groups of materials which can be employed in the LOM process are covered by the current application. The first group consists of flowable materials, i.e. powders, powder based slurries or pastes, and some liquids. The distinction between the powder based slurries or pastes and liquids lies in the fact that liquids are incompressible. Powders on the other hand are highly compressible due to the fact that its particles have space between them. If this space is partially filled with liquid then the mixture will retain some powder qualities such as compressibility and therefore is not to be considered as a liquid but rather as a powder based material. The second group of materials used in the LOM process is sheet materials such as metal foils and metal, plastic, ceramic and composite sheets.

A powder based LOM process is demonstrated in FIG. 1. It builds the three-dimensional object replicating earlier generated and cross-sectioned computer image by, first, spreading a thin layer of powdered material (1) on a platform (2) later, it is compressed by the action of a roller (3) running over the powder at a controlled pressure. At this point some bonds between the particles of the powder are formed and the layer (4) gets attached to the platform or the layer underneath. Although the bonds are fairly weak, the material stays attached even if the platform is turned upside down.

At this stage the geometrical information about the first cross-section is transmitted from the computer to the scanning component of the system which functions like an automated laser printer. It differs from the traditional paper printing devices by its ability to manipulate much more powerful laser beams, such as YAG or CO2 laser beams.

Next, the printer scans the surface of the powder with a focused laser beam (7) in the pattern of the desired cross-section (B). The operation creates a strong bond between the particles of the powder which belong to the cross-section and the cross-section of the adjacent layer.

Next, the platform is returned into its initial position. The process is repeated until all of the cross-sections are deposited, compressed, and "printed". The block of material created as a result of the laminating process resembles a sand casting within a sand mold, with a weakly bonded and fragile "green state" powder (5) surrounding strongly bonded object (6) which replicates the computer generated image. After that, the block of material created on the platform is subjected to an impact or vibration. As a result, the extra material previously unaffected by the laser beam falls off releasing the part that replicates the computer generated image.

There are a number of ways in which the process and the apparatus performing it can be implemented. For example, there are a number of powder based materials which can be used, such as plastic, metal, ceramic, or composite. They do not have to be pure powders and can in some instances contain certain amount of the liquid phase, most of which will be usually eliminated during the process or after its completion by evaporation or absorption etc. FIG. 27 illustrates a powder based slurry with the adhesive component (64) consisting of a liquid or a powder which fills the space between powder particles (63) which are in contact with each other. A mix of metal or ceramic powders and the adhesive component can be laminated, with the adhesive component eliminated by evaporation during or after the process. Also, the material can be preformed by press-rolling or press compaction into thin sheets of "green state" powder to be used in the laminating process.

Other variations of the process involve changing the sequence of the steps of the process or omitting some of the steps altogether. The basic steps of the process are: creation of the computer image of the object, cross-sectioning the image by the computer, powder based material deposition, layer leveling, compression, creation a layer of a cover gas or a liquid, "printing" the cross-section, removal of the extra material, post processing operations to improve the structural and surface qualities of the object.

One of the variations tried by me was successfully producing some plastic parts by the laminating process where powder compression step has been skipped altogether. The printing with a CO2 laser was used to fuse the particles of uncompressed thermoplastic powder. This step could be followed by a compression step to achieve better properties of the final object.

The type of the concentrated energy means used in the printing process can also be varied. Lasers of different wavelength with continuous wave or pulse characteristics, nonlaser light, particle beams consisting of electrons, protons or other high energy particles, microwave energy, heat generated by electric current. These energy means will usually be concentrated on the surface of the powder based material affected by them during the printing step. The concentration will usually be performed by a focussing lens or a mirror, or by forming energy or particle beams of a very small diameters.

Another possibility is to substitute concentrated energy means with concentrated jets of a matter during the printing step to chemically change or mechanically bond the material within the pattern of the cross-section. The main purpose of the printing step is to create a difference in a mechanical or a chemical property between the material which belongs to the cross-section and the material around it. This difference is used in the process to separate the object from the surrounding material.

Usually the difference is expressed in the strength of the bond between the particles of the powder. The powder affected by the printing means will usually have stronger bonds and be lees fragile than the unaffected powder. But it is not always the case. For example, a printing process similar to printing a negative of a picture can take place where a portion of the compressed powder layer which surrounds the cross-section to be defined is rapidly heated by the energy means in the presence of air or another oxidizing gas of a liquid. This heating causes oxidation of the particles of the layer and weakening of the bonds between them. Later a laminated object printed in this manner can be sintered in the sintering furnace. This will cause the previously nonoxidized powder which belongs to the object to form strong bonds while the surrounding material will remain weakly bonded and will easily separate during the separation step.

A chemical change can take place during the printing step. That change can also be utilized during the separation of the material surrounding the object. A combination of chemical and mechanical change can be utilized during separation. For example, if the particles of the compressed powder are heated, compacted, or otherwise affected by the printing means the pores between them become much smaller than the pores of the unaffected powder and sometimes they disappear altogether Therefore, if there is a solvent which is used for the removal of the extra powder it will penetrate and dissolve the powder surrounding the object much faster than the object itself.

Another way to introduce the change is to utilize laser compaction (FIG. 9). In this method a thin layer of liquid (38) is introduced on the surface of the compacted powder (14). Sometimes this layer is covered by a piece of material transparent to the laser beam (37). When the printing takes place this liquid rapidly evaporates creating extremely high pressures on the surface of the material. This causes it to compact and create frictional or deformation bonds between the particles.

The mechanical separation of the extra powder material can be accomplished in a number of ways. They include impacting the block of material with a mallet or a hammer, vibration, grid blasting, cavitation, ultrasonic cleaning and other means. The separation can be assisted by increasing the difference between the properties of the assisted by increasing the difference between the properties of the object and the surrounding powder after the object has been completed.

For example, a block of metal laminations which has been created as a result of the laminating process can be treated by a chemical which will relatively quickly penetrate the surrounding powder weakening the bonds between the powder particles. Another way to accomplish this weakening is to put the object in the furnace with an oxidizing atmosphere, thus burning or oxidizing the particles of the surrounding powder. Another possibility is to increase this difference for each layer separately during the execution of the process by first printing the cross-section and then introducing a reactive gas or a liquid above the surface of the layer and heating the entire surface which will cause the desired weakening of the bonds of the surrounding material.

Sometimes in order to assist the creation of the desired difference during the printing step a cover gas is used over the heated surface. This is usually done to prevent oxidation and to reduce the oxides which exist on the surface of the powder particles. These gases can be inert or other ones that do not react with the particular powder material. They can also contain reducing agents such as hydrogen and be the ones that are usually applied during the conventional powder metal sintering process.

The gas can be directed towards the surface of the part with a nozzle or be circulated above the surface of the part within an enclosure (FIG. 7). This enclosure can be a rectangular channel with a piece of a sheet material (37) transparent to the printing beam located above the upper surface of the laminated part (14). The need in the transparent material can be eliminated (Figure B) by extending the enclosure (21) from the scanner (28) directing the printing beam to the surface of the part (14). In this version the cover gas is introduced at the upper portion of the enclosure and is either contained within it during the printing or is allowed to escape through small openings (22) between the bottom of the enclosure and the laminated object. Another way to protect the powder against oxidation is to perform the printing step in vacuum.

After the object has been obtained by separating it from the surrounding powder a number of postprocessing operations can be performed with it to achieve the desired structural and surface properties. The grainy or step-like surface of the object can be finished and coated by conventional means, the object can be heat treated, recompressed or HIPed to reduce its porosity. Its pores can be saturated with another material.

There are a number of problems associated with the printing on the powder layers using concentrated energy or matter means. One of them is shrinkage. Another is internal stresses and associated warpage created by changes caused by the printing means. The shrinkage and warpage can be controlled by applying high pressure compaction of the powder before the printing step, thus causing stronger bonds between the green state particles which resist internal stresses causing warpage and shrinkage. However, these strong bonds can negatively affect the process of separation of the extra material after completion of the laminating process by making the powder separation excessively difficult or even impossible. Therefore, and optimal range of compaction pressures which differs from powder to powder usually exists.

One way to confront the shrinkage is illustrated in FIG. 4. The printing means are used during the lamination process to create a network of wires (32) which is usually independent on the shape of the created object (15) and spreads throughout the object and surrounding powder in a manner similar to the metal structure supporting reinforced concrete.

Another way to control warpage (FIG. 6) is to introduce draft angles (35) into the portions of the part which are parallel to the laminated layers. Still another way is to support these portions with ribs (36). The shrinkage can be accounted for by oversizing the part with the use of computer software techniques similar to the ones used in the conventional plastic molding or die casting.

A promising technique for controlling the warpage is illustrated on the FIG. 28. It shows an object created by the laminating process where instead of affecting a total cross-section of the object during the printing step the printing means fuse the powder along thin lines defining the periphery of the lamination. These lines are integrally bonded to each other during the laminating process to form a shell (64) encapsulating the rest of the powder material (14) which belongs to the object. Later the object defined in this manner is separated from the surrounding material and is cured in a furnace or is subjected to a source of curing radiation to cause fusion of the encapsulated material.

Besides powder based materials the LOM process can utilize sheet materials to create three-dimensional objects. The basic steps of the sheet based LOM process are similar to the powder based techniques. Just like in the powder process they include a step of generating a cross-sectional database from a three-dimensional computer image and cyclical steps of depositing the material comprising a single lamination, forming that lamination by printing means comprised of concentrated energy or matter, separating the material which belongs to the cross-section of the object from the surrounding material, and attaching that material to the stack of other laminations comprising that object. Therefore, many aspects and claims of the current application are common for both powder based and sheet based processes.

The cross-sections can be defined by either ablative removal (See FIG. 33) of areas (71) of the sheet material (60) in a raster fashion or by cutting that material in a vector fashion (See FIG. 34) around the periphery of these cross-sections (71). Usually the concentrated energy means used for the cross-section definition will be comprised of the laser beam manipulated by a laser scanner. Another possibility is to use an electron beam or a liquid jet cutting technique.

The raster based ablative removal approach has the advantage of making the processes of a cross-section definition and the removal of the material surrounding it simultaneous. However much greater energy expenditures are required for it since the material surrounding a cross-section has to be evaporated. Therefore, it will be easier performed for organic materials such as paper, foam, or plastic sheet.

Sheets used in the process can be comprised of several layers of different materials. Usually one layer which is called primary is at least five times thicker than another or others attached to it. For example, this primary layer could consist of precompressed "green state" powder while secondary layers attached to it could be made of an organic material. Or the primary material could consist of an organic sheet attached to a very thin layer of metal foil. Or the primary material could be a metal foil coated by an organic material. Or the primary material could be any sheet material coated with an adhesive.

One of the important differences between the sheet LOM process and the powder LOM process is that sheet laminations will not disintegrate after being formed separately from the stack. Therefore, some or all of these laminations can be laser cut or formed by other means prior to the attachment of the material comprising them to the stack.

For example, if formed laminations consist of the primary metal or ceramic sheets coated with plastic or a metal with the melting temperature lower than that of the primary material, then these laminations can be joined together by heating the entire stack to a temperature higher than the melting temperature of the secondary material but smaller than that of primary one. Another way to accomplish bonding of multiple laminations into a three-dimensional object is to use diffusion bonding process.

Although laminations can be formed after placing material comprising them onto the stack, usually their formation takes place at a different location than the laminations carrying platform. This assists in removing the heat generated by the concentrated energy means employed in the lamination forming process.

In case where sheet material employed in the process is a multilayer material the formation for a lamination by printing means can be accomplished by cutting or ablatively removing (FIG. 26) the primary material (68) without affecting the secondary one (69). For example, a foam sheet laminated with a secondary material such as thin metal foil can be affected by a laser beam evaporating the foam but not affecting the metal substrate to a significant degree. The advantage of this technique is in the fact that non attached pieces of a cross-section comprised of the primary material are held stationary with respect to each other by the secondary layer. After the formed laminations have been joined together by adhesive bonding the stack can be placed in an etching bath where the portions of the primary material are etched away by a chemical solvent.

Another example of a combined use of a chemical etching and laser forming technique can be considered by selecting a multilayer material comprised of a metal foil as a primary material coated or laminated on both sides with an organic material can be selectively burned by a laser beam thus exposing areas of metal which can be later chemically etched to complete the formation of laminations subsequently joined into a laminated object.

Adhesives can be advantageously used as secondary materials in the LOM process. The sheets can be either precoated with an adhesive or they can be coated by it during the laminating process. A precoated adhesive can be in the dry form so that it can be activated by wetting during the laminating process. The adhesive can also be of a kind activated by an UV or an infrared radiation.

An important and usually difficult problem which needs to be resolved in the LOM process is how to remove the material which does not belong to the laminated object. It becomes especially difficult for cross-sections of a laminated object which consist of several noncontiguous pieces. Another question to consider is when to remove the extra material, i.e. during the laminating process, or after. Sometimes (FIG. 25) the unremoved material (61) serves a useful role by supporting portions of laminations (62) which belong to the laminated object (15) which otherwise would hang in the air or be misplaced.

Several possible sequences of laminations assembling have been suggested in my earlier U.S. Pat. No. 4,752,352. They included a technique of sequential cutting portions of a given layer which do not include any other contours within themselves and either attaching them to the stack or discarding them. Another suggested technique was to join noncontiguous portions of a given lamination with thin strips of material which would be removed after the laminating process.

A number of different approaches are possible. The simplest one is as it was mentioned earlier to perform ablative removal of the extra material during the lamination forming process, thus, simultaneously forming laminations and getting rid of extra material. Another possibility is to use vector cutting around the periphery of cross-sections of the laminated object but not removing the extra material as the laminations are placed on the stack. In this case the extra material has to be prevented from being strongly bonded to the laminated object.

If an adhesive attachment is used, then computer means can be instructed to, first, reduce the amount of power delivered by the laminations forming laser and then to selectively burn, dry, cure, or deactivate at least some of the secondary material or adhesive which would otherwise be responsible for attachment of the extra material to the laminated object. The same (FIG. 30) layer forming laser beam (7) can be manipulated in a different manner to selectively activate the adhesive properties of a secondary or even primary layer within the portions (62) of the vector cut layer which belong to the laminated object (15). For example spot or contour braising or welding can be performed for the needed portions while leaving extra material unaffected. This extra material (FIG. 31) can be removed by a vacuum platform (56) from the stack.

Another possibility (FIG. 29) is to, first, contour cut each lamination in a vector fashion and then cut the extra material of the layer into multiple small pieces (67) in a crosshatching fashion. These pieces can be attached to the stack at the same time as the needed material and, thus, they will form a support structure for the laminated object. Later the extra material, although attached to the object (66), but relatively weak in strength, can be removed by mechanical means.

Still another way of separating extra material from the laminated cross-sections of an object is to utilize the fact that most of the thinly slices cross-sections of an object display a gradual variation in their geometry. Sudden differences in the geometry is a relatively rear occurrence (FIG. 32). Therefore, if a cross-section (71) has been formed and attached to a stack and the next one (62) does not display sudden changes in the geometry, and if it does not have portions to be discard which overlap areas of the previous cross-section then it can be attached to the previous layer by pressing it against the new layer coated with adhesive. Only the needed portions (62) of the layer will come into the contact with previously attached lamination and will be picked up through the use of the adhesive force while the unneeded material will remain on the platform (56). The platform (56) which positions and places lamination against the stack of laminations can be a piece of material transparent to the laser beam or it can include a vacuum or a magnetic pick up mechanism.

The question of how to support noncontiguous portions of laminations during the laminating process, or how to support structurally weak portions of the laminated object during that process can be resolved by including into the laminating sequence (FIG. 33) a step of filling the space (71) bounded by the thickness of a formed lamination or several formed and assembled laminations with a flowable material. This material could be a powder, or a powder based slurry, or a very viscous liquid, or a curable liquid.

If a powder is used a step of its compression can be included in the laminating sequence. This step can be performed for each layer separately or for several layers simultaneously. Similarly, for a curable liquid used to fill the space bounded by the laminations a step of exposure to the curing radiation can be included in the laminating sequence.

At the design stage the created geometry of the laminated object can represent a mold surrounding the space of an object to be produced. In this case the flowable material belongs to that object and therefore, the stack of laminations surrounding it is removed after the laminating process is complete.

In other cases the flowable material is used only to support laminations during the laminating process and, therefore, it is removed after the process is complete.

The flowable material used in the process can also be a liquid ceramic which after curing serves as a mold in the lost wax or a lost foam processes after material comprising sheet laminations is removed out of it through melting or burning. It is also possible to perform lost material processes after an object has been created by the powder based or sheet based LOM techniques, using that object as a lost material in that process.

The flowable material can fill the space within the laminations by flowing it onto one or several laminations and then scraping the excess with a scraping edge moving on the upper surface of this layer or layers.

As should be evident from the above, there are two principal types of machines capable of performing LOM processes: machines which form the material of a lamination after it has been attached to the stack and ones which form it before it has been attached to the stack. Each type has its own advantages and disadvantages. The type which cuts a cross-section after the attachment to the stack has a lesser chance of misplacing cross-sections with respect to each other since their relative positions are established by the beam positioning device (scanner or XY table) only. High precision of registration of layers and the simplicity of the device are the main advantages of this approach, but another benefit comes from avoiding warping of the laser cut material supported by the structure of the stack. A disadvantage of cutting on-stack is in somewhat greater difficulty of getting rid of the unwanted material surrounding the desired material in each cross-section as compared to the cut-off-the-stack method. The attachment to the stack can be assisted by a hot plate or a hot roller if a heat sensitive adhesive is coated onto the sheets used in the process. An ultra violet lamp can be used to bond sheets together if a UV curable adhesive is used.

Figure 39:
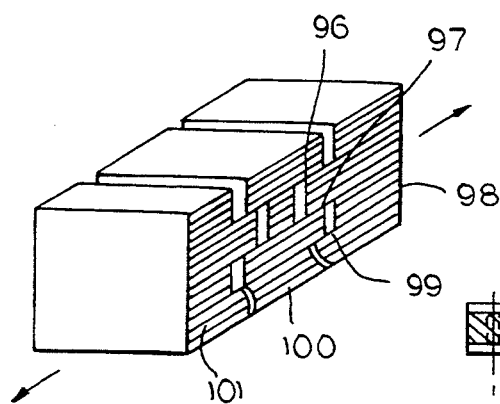
FIG. 39 is a perspective view of a part being separated from the surrounding material after the LOM process.

In the cut-on-the-stack technique the sheet is cut by the cutting beam after being put into the contact with the top lamination of the stack and in some cases (although not necessarily) attached to it. The beam power is adjusted to preferably cut the material to the depth of one lamination. One way to facilitate separation of the material surrounding the laminated object is to cut parting lines in the portions of the material surrounding object's cross-sections during the cutting step of the laminating cycle. This way separation of the object from the surrounding material can be performed in the same manner as a mold is separated from a molded object. As opposed to the conventional molding processes there is no limit to the number of parting lines which can be established. Another way to separate the unneeded material is to cut material surrounding every cross-section in a cross hatching fashion into a large number of squares (or other shapes). The surrounding material formed in this manner can be easily removed by mechanical means or by dissolving it in a solvent into which the whole laminated structure is immersed for a short period of time. The following are some of the primary techniques which are considered for separating the material which does not belong to the laminated object:

FIG. 39 illustrates how a laminated object (100) is separated from the unneeded portions (98) and (101). In order to accomplish the separation an unbonded condition has to be achieved on portions of cross-sections (96), (97), and (99) where unneeded material overlaps the material of the part. This condition can be achieved in several ways which will now be described in some detail.

Figure 38:
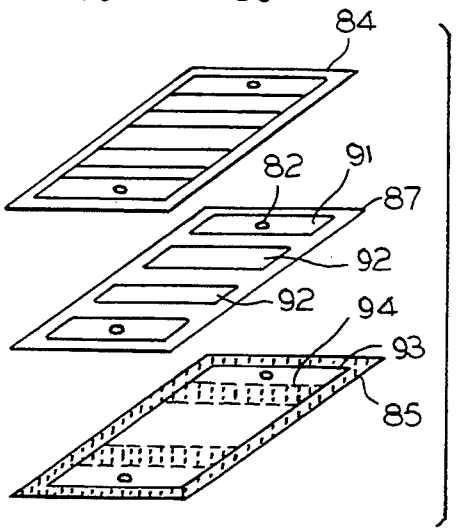
FIG. 38 is a perspective view of laminations bonded to each other using different attachment techniques and different provisions for the separation of unneeded material.

It is possible to use the beam of the laser to dry off the glue on the portions of the previous layer which must not become attached to the new layer. This can be done either before or after the attachment of the material which constitutes previous cross-section onto the stack. FIG. 38 shows sequential cross-sections (85), (87), and (84) of a part (81) shown on the FIG. 36. The cross hatched part of the cross-section (85) needs to be scanned with the laser beam in order to deactivate its adhesive and prevent its attachment to portions of the cross-section (87) which do not belong to the object being created. The area to be scanned can be established by Boolean subtraction of the next cross-section from the previous one. This way areas of the cross-section (85) which overlap portions (91) and (92) of the lamination (87) will not be scanned. Subsequent cross-section (84) can be cut around its periphery.

It is also possible to use the beam scanning in a manner described in the previous technique but with a power high enough to burn the material of the area being scanned so that an indentation is created which will prevent bonding of portions of the subsequent layer. This technique might be especially useful if the glue is deposited on the side of the material facing the stack. When an indentation is created the portions of the sheet material deposited on the top will not be in the contact with the material at the bottom and therefore will not glue to it.

It is further possible to cut the unneeded material before the sheet is attached to the stack. It is important to make sure the needed material stays attached to the sheet as it is done. Then the unneeded material is suctioned off. Then the needed material is brought into contact with the stack, glued by pressing it against the stack and cut off of the ribbon. This can be done either to eliminate unneeded material from layers or to prevent portions of some cross-sections from attaching to the others.

Figure 40:
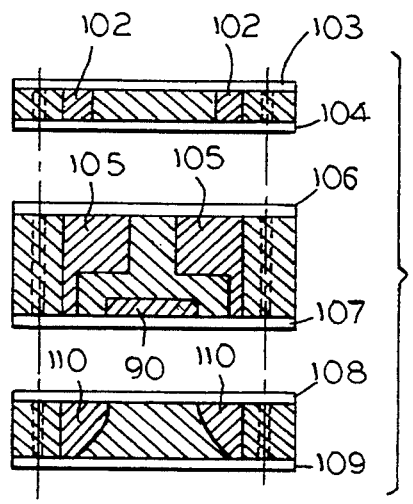
FIG. 40 is a cross-sectional view of a part laminated out of several slabs.

FIG. 40 illustrates another useful technique. The part being created can be divided into several slabs each of which can be easily separated from the surrounding material. These slabs can be created automatically by feeding partition sheets (103), (104), (106), (107), (108), and (109) onto the surface of the laminated stack when needed. It is recommended that a part being laminated should be surrounded by a support structure which is grown simultaneously with it (see FIG. 36). The support structure has dole pin holes which are cut in the process too. Partition sheets are bonded to the stacks and sandwiched between them weakly enough to be easily separated. In the case of creating a part consisting of slabs shown in FIG. 40, the process might proceed as follows: first, remove the sheet (108) and put dole pins through the holes of the slab; next, remove unneeded pieces (110); then, remove the sheet (107) from the next slab; next, remove the unneeded material (90); then, glue the slab to the previous one; next, remove the unneeded pieces (105) and the sheet (106); then, remove the sheet 104 from the next slab; next, remove the unneeded pieces (102); then, attach the slab to the stack; and finally, remove the sheet (103) and the support structure.

Figure 37:
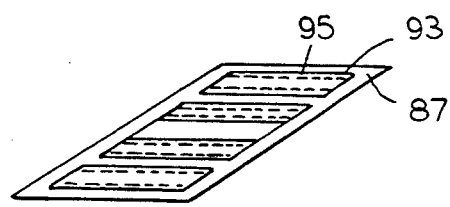
FIG. 37 is a perspective view of a lamination bonded by a selective bonding technique to a stack prior to being formed.

FIG. 37 illustrates how the cross-section (87) of the part (81) could be, first, bonded to the section (85) by moving a beam which activates bonding along dashed lines positioned within contours to be attached, and then cutting the material along solid lines. Corrections of the beam position taking into account diameter of the spot that it creates should be made (move it by a distance of the radius of the focal spot into the cross-section for the bonding step and outside of the cross-section for the cutting step). The cutting should be performed to the depth of a single lamination. The unneeded material could subsequently be vacuumed off or left on the stack for the future removal.

Figure 36:
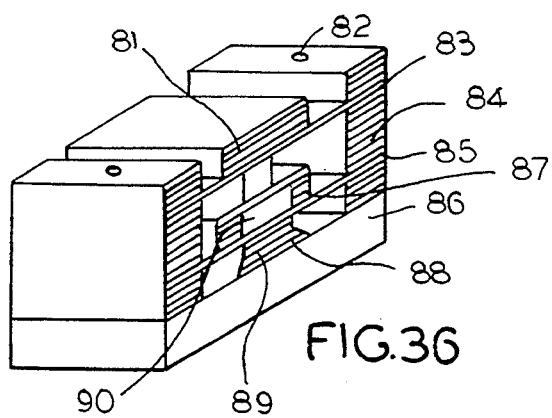
FIG. 36 is a perspective view of a laminated part supported by a vertical support structure laminated simultaneously with it.

FIG. 36 shows a possibility of creating a vertical support structure (84) consisting of stacks of material surrounding the part and laminated simultaneously with it. In order to support cantilever portions of suddenly expanding cross-sections (el) and (87), supporting layers (83) and (85) are created during the laminating process. Perforations through the support layers (83) and (85) are cut by the laser beam around the periphery of cross-sections of the object corresponding to the levels of the supporting layers in order to facilitate the separation of the support structure from the object after the completion of the laminating process. An immersion of the object with the support structure into an etching bath as well as mechanical means could be used for separation of the laminated object from the support structure.

In the case of metals, bonding could be performed by a laser or an electron beam welding or brazing. And in the case of plastics, in addition to the cutting laser beam, a second UV laser beam could be used for selective activation of a UV adhesive coating the sheets. Also, CO2 or YAG beams could be used for activating a heat sensitive adhesive. In the case of metals, these beams could selectively braze or solder metal foils used in the process.

Activating energy assisted selective bonding of the material which belongs to the laminated object can also be accomplished by illuminating glue coated sheet material with activating energy (e.g., light of a UV lamp) through a mask printed either on the material itself (if it is transparent to the activating energy) or on a separate sheet media. Also, the glue itself can be deposited by printing it onto the sheet within the areas of cross-sections to be bonded. A more detailed description of these techniques will be given in the description of the sheet system.

The system capable of selective bonding can be used to laminate a three-dimensional object out of more than one material by either supplying different materials for different laminations or even by supplying different materials for a single lamination. The materials which comprise a single lamination can be attached to the adjacent lamination by sequentially performing the selective bonding step for each of them, followed by the lamination forming step outlining the area comprised of that material, followed by the removal of the material surrounding that portion of the lamination.

Just as there are many similarities between the powder and the sheet based LOM processes there are a number of similarities between the automated systems which implement them. Therefore, many features of the powder system are present in the sheet apparatus.

The preferred embodiment of the powder based LOM apparatus is shown on the FIG. 2. This embodiment incorporates a powder carrying platform (2) located on a vertical stage (16). The platform and the laminated powder layers (15) located on it are surrounded by an enclosure (17) whose walls are perpendicular to the laminated layers. The platform moves within the enclosure like a piston within a cylinder. The enclosure is necessary to prevent the breakage of the powder part during the compression operation. It also helps to define the outer periphery of the laminated layers, In order to reduce the friction between the laminated powder layers and the enclosure an open end or closed loop ribbon (9) can be introduced between them, The enclosure which also supports the housing of the vertical stage is attached to a carriage (18) traveling reciprocally on two linear slides (31), The enclosure is located between the slides in such a manner that the distance (30) between the top of the enclosure and the slides is much smaller than the total height of the fully extended vertical stage, This condition helps to reduce the bending moment applied to the slides during the compression operation and prevents wedging of the carriage on the slides, The cycle starts by moving the platform at a constant speed under the powder container (12), At this point the powder flow from the container is started by a linear actuator (10) opening the gate (11) covering the slot located at the bottom of the container. The flow can be helped by a feed mechanism located near the slot. The layer of the deposited powder may be somewhat uneven at this point. It is flattened by the scraper (25) removing the excess of the powder from the part which continues its linear movement. The shape of the scraper can vary depending on the application. Several possible shapes, including the straight edge (25a), flat bottom (25b), and curved bottom (25c) are shown on the FIG. 3.

The thickness of the deposited powder layer is regulated by the movement of the vertical stage (16) which establishes desirable distance between (47) from the deposited layer to the upper edge of the enclosure should be made as small as possible to insure good support of the layers by the enclosure and to create a correct outline of the layer's periphery.

As the linear movement of the carriage continues the deposited powder layer is compressed by a stationary roller. The pressure of the compression is regulated by the relative distance (19) between lower portion of the roller and the deposited powder layer and is monitored by the force sensor (26). This distance is regulated by the movement of the vertical stage (16). The roller can be substituted by a system of rollers (FIG. 12) which may be covered with a ribbon (48) which forms a less than 20 degrees angle (40) with the compressed layer (1).

Continuing its movement the part goes under the vacuum cleaning device (20) which suctions the extra powder which has been removed by the scraper onto the upper surface of the enclosure (17). The powder is transported by the moving air steam to a powder separator (13) located above the powder in the powder container. The cyclone or a screen type separator returns the extra powder back into the powder container.

If it is necessary to introduce some liquid on the top of the compressed powder layer it is sprayed onto the surface of the laminated part from the nozzle (24) as the carriage continues its linear movement. Moving further the carriage gets under the laser scanner (28) which steers the beam produced by the laser (29). At this point the cover gas is supplied from the hose (27) into the enclosure (21). During the portions of the cycle when the printing is not performed the enclosure is covered by the gate (22) located on a linear elide and pushed by the spring (23). As the carriage moves under the enclosure it pushes the gate away from it, thus exposing the upper surface of the laminated part to the laser beam (7).

If the scanner is of the type that scans along a single line then the carriage continues its movement during the printing step to cover the whole surface of the powder layer with the scan lines. On the other hand, if the scanner is capable of steering the beam around the surface then the platform is stationary during the printing step. The distance between the scanner and the platform is kept constant from cycle to cycle by downward movements of the vertical stage as the new layers are added to the laminated part. After the completion of the scanning the carriage is returned into its initial position and the new cycle begins.

A modified version of the preferred embodiment is shown on the FIGS. 19 through 23. This apparatus (FIG. 19) includes a ribbon (50) with a flat upper surface. This ribbon is attached to the laminations carrying platform located on the vertical stage (16). The ribbon is attached to the upper edge of that structure and is directed on the laminations carrying platform. The material deposition container (12) is located above the ribbon, so that the material has the ability to flow from the container (12) into the enclosure (17) only when the exit from the container and entrance to the enclosure overlap. The upper surface of the ribbon, the exit from the container, and the entrance to the enclosure are located in the same plane.

In order to deposit flowable material onto the laminations carrying platform and simultaneously level it (FIG. 22) the laminations carrying platform surrounded by the vertical support structure (17) is moved under the material container (12). The material flows from the container onto the surface of the upper lamination surrounded by the structure it moves the lower edge (54) of the container levels the layer (53) to the desired thickness. The container can have walls which are essentially vertical or form a less than 20 degrees angle with the vertical direction.

The same method of deposition can be utilized in a version of the system which uses a rotary table as a mover of the support structure (17) instead of linear slides. In that case the upper surface of the table serves the same purpose in the material deposition process as the ribbon (50).

After the layer has been formed the carriage (FIG. 20) directed by linear ways (31) is moved under a flat piece (51) which is located at the compressing station of the apparatus (FIG. 21). The vertical stage (16) is elevated and the powder on it is compressed against that flat piece. The pressure of the compression is monitored by a force gage located within the support structure of the support piece. Next, the stage lowered to establish a focal distance between the upper layer of the laminations and the laser scanner. The carriage is moved under the laser scanner (FIG. 23) where the laser beam directed by the scanner performed the laminations forming operation.

Besides just described preferred embodiment there are other possible configurations of the LOM system. All of these configurations perform the basic steps of the LOM process in different ways. FIG. 10 shows a rotary table (39) which moves the enclosure (17) containing the vertical stage (16) and the powder carrying platform (2) around a circular trajectory. The powder deposition device (12), the compression roller (3), and the printing scanner (28) are located around this circle and perform the basic steps of the process as the platform is transported by the rotary table to them.

FIG. 11 shows a system where the powder container (12) and the roller (3) reciprocally move over the surface of the laminated part (14) which does not move in the horizontal plane. The powder is deposited from the container on one or the other side of the roller depending on the direction of its movement.

The deposition is accomplished by opening one of the gates (11) located on both sides of the roller. As the powder container moves away from the surface of the laminate the printing device (28) located above it prints the cross-section. After that the powder platform is lowered to accommodate a new cross-section.

FIG. 13 shows a roller (3) which magnetically or electrostatically attracts a thin powder layer (1) from the powder container (12) as it rotates while the powder flows onto its surface from the container. Simultaneously the roller rolls over the upper surface of the laminated part located on a reciprocating platform. As the roller with the powder on it rolls over the surface, the powder gets deposited and compressed at the same time.

FIG. 14 shows LOM system in which a stream of particles (43), suspended in air or a cover gas is resurrecting through a loop. Part of this loop is a rectangular channel with a transparent upper surface (37) located above the top surface of the laminated part. The beam of the printing device can be transmitted through this surface. The powder deposition is accomplished by a vertical movement of the powder carrying platform (2). The powder from the stream gets caught between the upper surface of the laminate and the transparent piece (37). It is compressed by the same movement. After that, the beam transmitted through the transparent piece (37) prints the cross-section. Next the platform is lowered allowing the steam of the suspended powder to resume its flow. The concentration of the powder in the steam is maintained by adding it from the container (12).

FIG. 15 shows a similar arrangement to the one described previously but the circulating powder is deposited and simultaneously compressed by a reciprocating roller. The roller catches some of the powder under it as it rolls over the surface of the laminate. The printing beam shining through the transparent roof of the enclosure and the semitransparent stream of suspended powder prints the cross-section on the surface of the laminate.

FIG. 16 shows a version of the LOM system which instead of previously described cycling procedures preforms depositing, compressing and printing steps of the LOM process continuously and simultaneously. In this system the powder carrying platform (2) is circular. As in the rotary table version the powder container, the roller, and the printing device are located around a circle. But in this case the powder continuously flows from the powder container on the flat side of the cylindrical laminate. It is simultaneously compressed by a roller located along one of its radii. The scanner also operates continuously along one of the radii. The platform is continuously lowered as the thickness of the laminate increases.

FIG. 17 shows another version of the LOM system operating in a continuous fashion. But in this case the powder is deposited onto a cylindrical surface. The deposition is accomplished by, first, depositing the powder on a continuously moving conveyor belt. A cylinder (49) capable of vertical and rotary movement presses against the surface of the powder carrying belt as shown on the picture. As the new layers of the powder adhere to the surface of the powder cylinder (14) its diameter increases. At the same time the scanner (28) prints the object on the surface of the cylindrically compressed powder layer using cylindrical coordinate system for definition of the part's geometry.

FIG. 18 shows a version of the LOM system which uses a plate conveyor 46 as an intermediate carrier of the deposited powder. First, a powder layer is deposited onto a transparent plate (37) carried by the conveyor. Then the conveyor transports the plate under the powder carrying platform (2). Next, the linear stage 16 moves the platform down so that the upper surface of the laminate presses against the newly deposited powder layer thus accomplishing the deposition and the compression. After that the printing beam shining through the transparent plate prints the cross-section. Instead of the conveyor belt a rotary table with a transparent surface can be used as an intermediate carrier of the deposited powder. Another possibility is to have nontransparent plates on the conveyor and move them after each compression step so the printing beam will go through the space between two neighboring plates.

As it was mentioned earlier the sheet system can be constructed using many design features of the powder apparatus. In fact the same system can be used for sheet or powder processes. The preferred embodiment of this system (FIG. 24) includes the flowable substance container (12) associated with the reciprocating carriage connected to the piston-like enclosure (17) attached at the upper edge to the ribbon (50), just like it was done in the powder system shown on FIGS. 19 through 23. Additional elements of this system are a sheet feeder (57) capable of feeding sheets (60) one at a time on the surface of the ribbon (50), a vacuum pick up plate (56) capable of picking up sheets or portions of them from the surface of the ribbon or from the laminated stack. Other elements of the system are extra material remover (59), a compression plate (37) made out of material transparent to the curing energy delivered by the source (55), and a water or glue deposition roller (58).

There are four stations at which the process is performed:

1—The flowable material depositions station. When the enclosure (17) is moving under the material container (12) the material which could be a powder based substance or a curable liquid is deposited in the space bounded by one or several formed laminations and is leveled by the lower edge of the container at the same time. The top surface of the laminated stack coincides with that edge when the leveling takes place.

2—The curing or compression station. If the flowable material is a powder based material then compression is performed there by elevating the vertical stage (16) and pressing the stack against the plate (37). If a curable liquid is used then the energy source (55) delivers the curing energy to the liquid in that position.

3—The Stacking station. At that station a formed lamination is deposited on the surface of stack located on the platform (2). The deposition is performed by the vertical movement of the stage (16) and pressing the upper surface of the stack against the formed and adhesive coated lamination (60). At this point the suction force exerted by the suction pick up plate is released.

4—The sheet deposition and forming station. At this station sheets are deposited from the sheet feeder onto the surface of the ribbon (50) or a vacuum platform attacked to it. The combination of the laser and the scanner located above it cut that sheet on the platform the form the lamination.

The laminating cycle for the above system could be performed in the following manner. First, a sheet (60) is deposited from the sheet feeder at the sheet depositing station while the carriage (17) is located in the position III (FIG. 24). It is formed into a lamination by the laser scanner according to the instructions of the computer. Next, the carriage is moved into the position II and the formed lamination is moved into the position III. The pick up plate (56) picks up the lamination (60).

Then, the carriage (17) is moved into the position III. While it moves the roller (58) activates the adhesive on the bottom of the sheet held by the pick up plate or deposits a layer of an adhesive. At that position linear stage (16) moves up and presses the upper layer of laminate against the lamination held by the plate (56) stimulating its attachment. If there is extra material remaining on the pick up plate then the carriage moves into the position II. The extra material is dropped onto the ribbon (50) and when it is moved into the position IV it is pushed from the ribbon by the actuator (59).

If the system is instructed to fill the space between the laminations with a flowable material then the movement under the material container (12) is performed by the carriage (17) the same way as it was described earlier for the powder system. If the flowable material needs to be cured by the curing radiation then the carriage is stopped at the position II.

Figure 41:
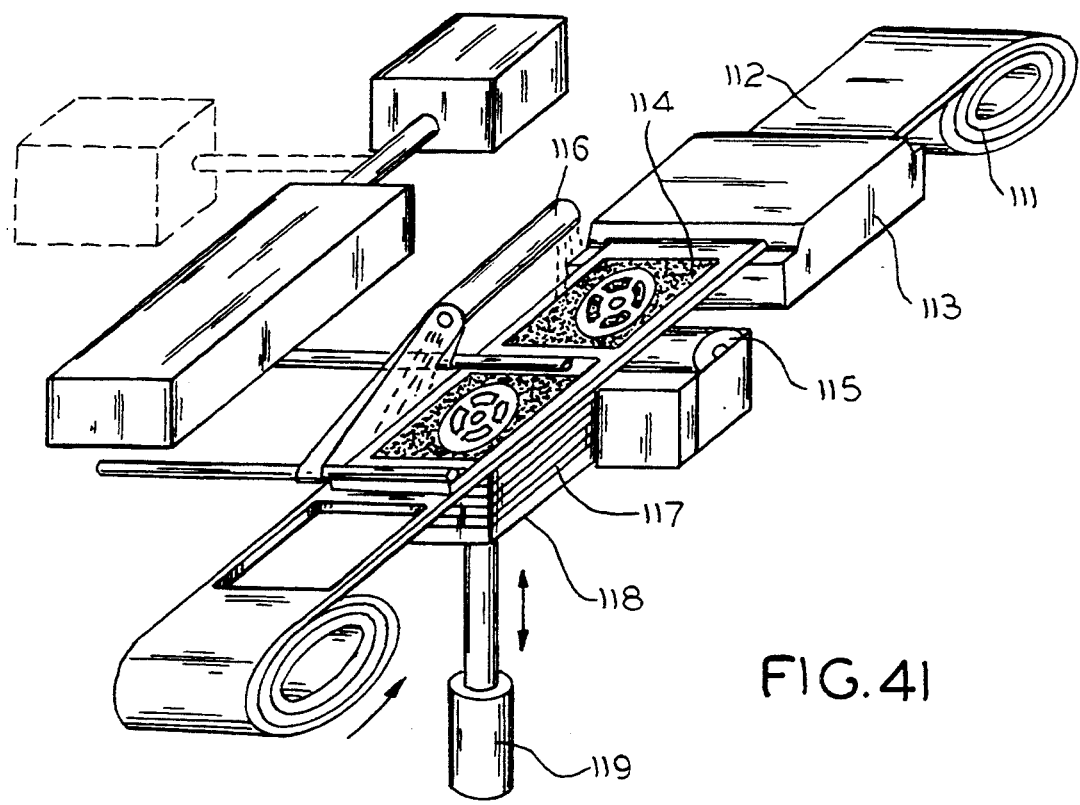
FIG. 41 is a perspective view of a cut-on-the stack sheet LOM system during the bonding step of the laminating procedure.
Figure 42:
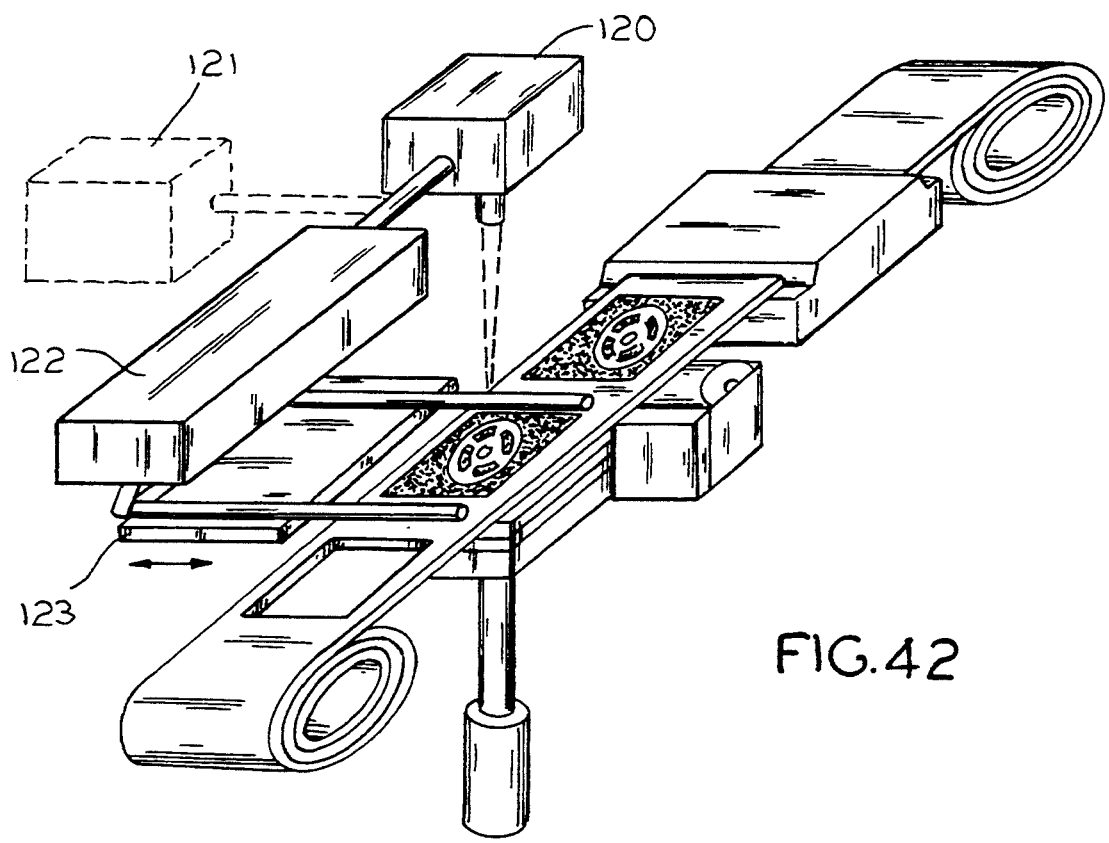
FIG. 42 is a perspective view of a cut-on-the stack sheet LOM system during the cutting step of the laminating procedure.

Another preferred embodiment of the sheet LOM system is shown in FIGS. 41 and 42. This system consists of a CO2 or YAG cutting laser (122) and beam positioning device (120) which might be a scanner or an XY table. Platform (118) capable of computer controlled movement towards and away from the scanner is positioned under the scanner (120) by a vertical stage (118). The upper surface of the platform is used for carrying laminations. Above the platform there is a ribbon handling mechanism capable of computer controlled handling of the sheet material (112) fed from a roll (111). This material can be also fed on the top of the laminated stack from a sheet feeding mechanism.

The material could be a plastic film, or even paper. As it is positioned above the laminated stack (117) it is coated with a glue from a glue depositing mechanism (115). After depositing of the glue, the ribbon (112) is pressed against the stack (117). To achieve a uniform bonding a roller or a flat plate (123) is used for applying pressure against the ribbon.

After the sheet has been attached to the stack the laser beam forms a cross-section by cutting the material on the top of the stack preferably to the depth of one lamination. The system can be built to selectively bond portions of material which belong to the laminated object onto the stack. For example if a heat activated glue used in the process the same laser (122) that performs the cutting could be used to selectively heat the material of a cross-section in order to bond needed portions of it to the stack before the cutting (just move the beam faster). An additional UV laser (121) can be added to the system (possibly using the same scanner (120)) in order to selectively activate the adhesive within the boundary of a lamination.

Another way to achieve a selective bonding is to use a printer (113) for printing negatives of cross-sections on the transparent ribbon (112) before placing the material on the stack. The picture obtained in this manner will serve as a mask for selecting areas of a cross-section to be bonded to the stack. The bonding can be accomplished by pressing the material (112) with the mask printed on it against a flat piece of glass (123) and exposing the material to a UV light from a lamp (116). After the gluing the glass and the lamp are moved aside and the laser beam performs the cutting to the depth of one lamination- The precision of positioning of the printed cross-section on the stack is not a serious concern since the final precision of the part will be determined by the cutting laser beam just like in is done in the current version of the machine. The masking images created on the laminated sheet can be printed in color and extend a short distance inside the boundaries of the cross-sections which they represent. The coloring of a lamination should correspond to the color of the three-dimensional surface of the computer generated image at the level of that particular lamination.

The glass plate (123) could be substituted with a wire screen made out of very thin (0.001–0.005") wires forming a grid with fairly large (0.020" or larger) cells. Because wires are so thin they are expected to allow the laser beam with the spot size 0.010" or larger to process the material underneath. On the other hand, a negative air pressure applied from the top of the screen could attract the unneeded material surrounding cross-sections which have been bonded to the stack using selective bonding techniques described earlier. In case of metal foils this operation could be performed with a magnetic force applied in a similar fashion. Extra material will be moved with the screen away from the stack and discarded in a waste basket as the negative air pressure or the magnetic force is eliminated.

Using these techniques a three-dimensional objects can be manufactured out of more than one material by either supplying different materials for different laminations or even by supplying different materials for a single lamination. The materials which comprise a single lamination can be attached to the adjacent lamination by sequentially performing previously described selective bonding step for each of them, followed by the lamination forming step outlining the area comprised of this material, following by the removal of the material surrounding that portion of the lamination.

Another version of the cut-on-the-stack machine which has the capability of removing the extra material surrounding each cross-section during each laminating cycle is illustrated on the FIG. 35. In case of a metal part being made a metal cutting YAG laser (72) generates a laser beam which is manipulated by a beam positioning device (73). This device may be a scanner or an XY table carrying two reflecting mirrors or an optical fiber transmitting the beam. A metal ribbon coated on the top with a thin layer of copper is fed from a roll (75). If the ribbon is not clad a thin layer of brazing paste or a glue can be deposited from a depositing device (80).

Initially, the stacking platform (76) moving within the cylinder (77) presses the ribbon against a flat piece of glass (74). Next, the laser beam brazes the first cross-section to the platform by performing a relatively fast movement within the cross-section. A possible trajectory of this movement for a newly attached cross-section is a line parallel to the periphery of the cross-section preceding it on the stack and located within it. Later, the platform moves a short distance away from the glass and the laser performs cutting in the high power pulsing mode. The power of the beam is adjusted to perform cutting to the depth of a single lamination. A rectangular periphery is cut around the cross-section. This releases the ribbon for further movement. The cut off pieces fall onto the glass (74). They are swept by a reciprocally moving wiper blade into a waste basket. The ribbon (75) advances and the process resumes. After all of the laminations have been deposited and cut the part (79) is removed from the platform (76).

If a plastic film is used for the production and a CO2 laser is required instead of a YAG one then the glass (74) can be substituted with a wire screen having wires which are thinner than the laser beam which passes through the mesh. If a UV curable adhesive is used in the process then a UV laser can be associated with the CO2 one in a manner similar to the one described for the previous version of the system.

A cut-off-the-stack version of the system is illustrated on the FIG. 43. This type of a system can be used for the production of plastic and metal parts. In case of producing a part out of a metal a sheet metal ribbon is fed into the machine from a roll (143). The ribbon is made from 0.002"–0.015" thick metal clad with a material of lower melting temperature (e.g., copper) on the top. Just like in the previously described version a brazing material depositor may be incorporated into the system to avoid the necessity of using a clad or coated material. Copper is known to reflect laser beams. However, the inventor's early experiments have shown that its thickness is not sufficient to significantly impede the cutting process. He produced some successful samples by cutting from the copper coated side. A laser beam is generated by the laser (125) and directed to a cutting area of the ribbon (124) with the use of two mirrors (127) and (129) attached to X and Y stages of the positioning table (128) (or a scanner). The beam is focused on the ribbon with a focusing lens located on the Z stage (126) of the positioning system.

In the process of creating a laminated part the laser beam is manipulated with the XYZ positioning table to cut a cross-section of a part designed on a CAD system. A five axis laser system can be utilized at this stage, to achieve a better approximation of the final geometry of the part by tilting the laser beam during the cutting step. Initially a rectangular sheet larger than a cross section is cut out of the ribbon. It drops onto the conveyor (133). The conveyor carries several glass plates (135) transparent to the YAG laser beam. As the rectangular portion drops it may be attracted to the surface of the plate by a magnet positioned under the plate (if it consists of a magnetizable material). After cutting the rectangular boundary the laser beam cuts the rest of the cross-section around its periphery as it rests on the conveyor. The material of the conveyor is not absorbing of the laser radiation used for cutting.

Later the conveyor (133) moves the cut cross-section to the stacking station (140). After the cross section (134) is positioned under the stacking platform (139) the platform is moved downward until the stack located on it presses against the cross-section (134) to be attached. A load sell (141) transmits the feedback about the load. The amount of load necessary to apply to a particular cross-section will be proportional to its area. The area will be calculated by the computer.

Once the cross-section is pressed against the stack the second laser (130) turns on. Its beam manipulated by the second XYZ positioning system (131) or by a scanner will scan the bottom surface of the cross-section within the area to be attached to the stack (it could be portion (136)). If parting lines have been cut in the material surrounding a cross-section (as shown in the cross-section (134)) the beam can raster scan the whole rectangular area and the surrounding material can be separated from the part in a mold like fashion. Otherwise, the extra material surrounding the newly attached cross-section stays on the conveyor as the laminating platform (139) is elevated. This material gets discarded into the waste basket (132) as the conveyor moves for the new cycle. The intensity and the speed of motion of the second laser beam has to be adjusted to melt the brazing layer. Instead of having another laser the beam from the laser (125) can be split into two beams, with the second beam utilized for brazing.

In order to achieve successful lamination the bottom of the stack should be free of oxide film and of dross (resolidified metal drops which are usually produced as a result of laser cutting). To clean the bottom of the stack the positioning system of the stacking station (138) brings it into the contact with with the grinding belt (142).

If a UV curable adhesive is used in the production along with some plastic or composite sheet material then the second laser (130) could be a UV laser. Also a UV lamp cold be used to illuminate the bottom of the stack (138) after a lamination has been attached and the extra material surrounding it has been removed in a manner described above. This step would allow to achieve full bond for the newly attached lamination with the stack. In case of metal the same effect could be achieved by introducing heat to the whole surface of the lamination, for example, through a contact with a hot plate. In case of a composite fiber sheet used as as raw material a part's shape could be first defined using a relatively weak bond provided with, for example, a heat activated adhesive and, next, after the part is separated from the unneeded material it could be impregnated with a two component resin traditionally used in manufacturing of composite parts. The advantage of this system is that it might be faster than the one described earlier since the bonding and cutting are performed simultaneously at different stations.

I claim:

1. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said individually contoured laminations being defined by said lamination forming means through ablative removal of areas of said individually contoured laminations in a raster fashion.

2. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said material comprising said individually contoured laminations being a multimaterial sheet where at least one material comprising said sheet is a primary material serving as a carrier for a secondary material adapted to facilitate bonding of said individually contoured laminations to each other;

portions of said primary layer or said secondary layer of material which do not belong to said three-dimensional object and remain unremoved after forming said individually contoured laminations being removed from said three-dimensional object by chemical etching after forming said three-dimensional object.

3. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said material comprising said individually contoured laminations being a multimaterial sheet where at least one material comprising said sheet is a primary material serving as a carrier for a secondary material adapted to facilitate bonding of said individually contoured laminations to each other;

said secondary layer of material serving as a protective cover for said primary layer of material in a chemical etching process used for forming said individually contoured laminations, and said individually contoured laminations being formed by, first, using said lamination forming means in a selective removal of portions of said secondary layer of material and then chemically etching said primary layer of material within the areas of overlapping removed areas of said secondary layer of material.

4. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said material comprising said individually contoured laminations being a multimaterial sheet where at least one material comprising said sheet is a primary material serving as a carrier for a secondary material adapted to facilitate bonding of said individually contoured laminations to each other;

portions of said material which do not belong to any of said individually contoured laminations not being removed from said platform after forming said individually contoured laminations;

said portions of material which do not belong to one of said individually contoured laminations being prevented from integrally bonding to a preceding layer of said three-dimensional object by using said lamination forming means to selectively burn, dry, cure or deactivate at least some of said material of said layer preceding said lamination.

5. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said material comprising said individually contoured laminations being a multimaterial sheet where at least one material comprising said sheet is a primary material serving as a carrier for a secondary material adapted to facilitate bonding of said individually contoured laminations to each other;

portions of said material which do not belong to any of said individually contoured laminations not being removed from said platform after forming said individually contoured laminations;

said unremoved portions of said material being prevented from integrally bonding to said three-dimensional object by selectively activating adhesive properties of said secondary material by a laser beam only within the periphery of said individually contoured laminations.

6. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said material comprising said individually contoured laminations being a multimaterial sheet where at least one material comprising said sheet is a primary material serving as a carrier for a secondary material adapted to facilitate bonding of said individually contoured laminations to each other;

portions of said material which do not belong to any of said individually contoured laminations not being removed from said platform after forming said individually contoured laminations;

said unremoved portions of said material being cut in a crosshatching fashion into multiple pieces which, after said assembling step, are separated from said three-dimensional object by mechanical means.

7. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said individually contoured laminations being formed by a laser beam or a beam of other source of energy transmitted through a flat piece of material transparent to said beam or through a screen having wires thinner than said laser beam or beam of said other source of energy passing therethrough.

8. The method as defined in claim 7 wherein first, said material is cut on the periphery of said individually contoured laminations; next, said cut material is pressed between a stack of said individually contoured laminations assembled on said platform and said flat piece of transparent material or screen; and then portions of said material defining said three-dimensional object are welded, soldered or adhesively attached to said stack by a laser beam or other energy source directed through said flat piece of transparent material or screen.

9. An apparatus for forming an integral three-dimensional object from laminations, comprising:

means for storing and supplying a material in layer-by-layer fashion;

concentrated energy or matter means for forming at least a portion of each layer of said material into an individually contoured lamination in a shape required for assembly of a plurality of said individually contoured laminations in a preselected sequence into said three-dimensional object;

electronic means for controlling the operation of said lamination forming means to provide said individually contoured laminations for said three-dimensional object in a manner forming a bonded support structure in response to data entered concerning said three-dimensional object;

means for assembling said plurality of individually contoured laminations formed from said material in said preselected sequence into the form of said three-dimensional object;

said plurality of individually contoured laminations being assembled such that each of said laminations is integrally bonded to the next adjacent of said individually contoured laminations to complete formation of said integral three-dimensional object; and means for separating said individually contoured laminations from said bonded support structure, obtaining as a result said three-dimensional object represented by one of said support structure and said individually contoured laminations;

said lamination forming means including a platform capable of holding a sheet material comprising said individually contoured laminations through a suction force applied through a flat filter screen, or a magnetic, an electrostatic or a gravity force, and where said platform is carried by a conveyor, or a linear slide, or a rotary table, or it is comprised of the surface of said conveyor or said rotary table; and where said material carried by said platform can face the ground, or away from the ground; and where said platform is capable of carrying said material from a station where it is formed into said laminations to a station where said laminations are assembled into said three-dimensional object.

10. The apparatus as defined in claim 9 wherein said lamination forming platform is different from or the same as said lamination assembling platform, and where each such platform can perform controlled and cyclical movements under signals of said operation controlling means, and where said lamination assembling platform is instructed by said operation controlling means to press said material comprising said lamination against a flat surface of said lamination carrying platform or another flat piece of material or a wire screen to assist in attachment of said lamination during said lamination assembling step, or where said attachment is assisted by a roller capable of performing movement parallel to the surface of said platform and pressing said material against the uppermost lamination of said stack.

11. The apparatus as defined in claim 10 wherein if said material is supplied as a cut sheet or a ribbon which has only one lamination cut out of its width during each cycle, then said cyclical movement performed by said lamination forming platform carries said formed lamination to said lamination assembling platform over the same distance during each cycle.

12. The apparatus as defined in claim 10 wherein said lamination assembling step or said lamination forming step is at least in part performed by said laser beam or activating light transmitted through said wire screen or said flat piece of material.

13. An apparatus for forming an integral three-dimensional object from laminations, comprising:

means for storing and supplying a material in layer-by-layer fashion;

concentrated energy or matter means for forming at least a portion of each layer of said material into an individually contoured lamination in a shape required for assembly of a plurality of said individually contoured laminations in a preselected sequence into said three-dimensional object;

electronic means for controlling the operation of said lamination forming means to provide said individually contoured laminations for said three-dimensional object in a manner forming a bonded support structure in response to data entered concerning said three-dimensional object;

means for assembling said plurality of individually contoured laminations formed from said material in said preselected sequence into the form of said three-dimensional object;

said plurality of individually contoured laminations being assembled such that each of said laminations is integrally bonded to the next adjacent of said individually contoured laminations to complete formation of said integral three-dimensional object; and means for separating said individually contoured laminations from said bonded support structure, obtaining as a result said three-dimensional object represented by one of said support structure and said individually contoured laminations;

said lamination forming means including a platform;

said platform and said assembly means being located at different stations and including means for performing cyclical movement between said platform and said assembling means.

14. An apparatus for forming an integral three-dimensional object from laminations, comprising:

means for storing and supplying a material in layer-by-layer fashion;

concentrated energy or matter means for forming at least a portion of each layer of said material into an individually contoured lamination in a shape required for assembly of a plurality of said individually contoured laminations in a preselected sequence into said three-dimensional object;

electronic means for controlling the operation of said lamination forming means to provide said individually contoured laminations for said three-dimensional object in a manner forming a bonded support structure in response to data entered concerning said three-dimensional object;

means for assembling said plurality of individually contoured laminations formed from said material in said preselected sequence into the form of said three-dimensional object;

said plurality of individually contoured laminations being assembled such that each of said laminations is integrally bonded to the next adjacent of said individually contoured laminations to complete formation of said integral three-dimensional object; and means for separating said individually contoured laminations from said bonded support structure, obtaining as a result said three-dimensional object represented by one of said support structure and said individually contoured laminations;

said lamination forming means including a platform located on a vertical linear stage and being surrounded by a vertical support structure so that platform serves as a piston and said vertical support structure serves as a cylinder;

said vertical linear stage being attached to a carrier, part of which is comprised of said vertical support structure, where said carrier has the ability to move parallel to a surface of said individually contoured laminations.

15. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

the step of separating said individually contoured laminations to obtain said three-dimensional object from said support structure being accomplished by cutting a parting line in said support structure during operation of said lamination forming means in such a way that said three-dimensional object can be separated along said parting line thereafter.

16. A method of forming an integral three-dimensional object from laminations, comprising the steps of:

positioning a platform in proximity to means for forming a material into a plurality of individually contoured laminations and providing a support structure for said laminations;

providing electronic means for controlling the operation of said lamination forming and support structure providing means;

entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and separating said individually contoured laminations from said support structure, obtaining as a result said three-dimensional object represented by one of said support structure and said individually contoured laminations;

said material comprising said individually contoured laminations being a multimaterial sheet where at least one material comprising said sheet is a primary material serving as a carrier for a secondary material adapted to facilitate bonding of said individually contoured laminations to each other;

said primary material being at least partially transparent to an ultraviolet or other radiation capable of causing selective bonding or curing of said secondary material within the areas of said lamination to which said radiation is to be delivered, and wherein operation of said lamination forming and support structure providing means includes delivering an ultraviolet or other radiation to cause said selective bonding, and wherein said selective bonding is performed during operation of said lamination forming and support structure providing means by moving said ultraviolet or other radiation within the areas common to said individually contoured lamination and the adjacent individually contoured lamination to which it is integrally bonded, or by printing a mask which leaves said primary material only within the areas which are selected for bonding by said electronic means and then illuminating said individually contoured laminations through said mask, or be selectively depositing or printing said secondary material only within the area of said individually contoured laminations where said integral bonding is required by said electronic means.

17. The method as defined in claim 16 wherein first, said material comprising one of said individually contoured laminations is attached to said laminating platform or to other individually contoured laminations comprising a portion of said three-dimensional object using one of said selective bonding techniques, and then said material comprising said one of said individually contoured laminations is cut by said lamination forming and support structure providing means around the periphery thereof to a depth of one lamination, or said material comprising said one of said individually contoured laminations is, first, cut around the periphery thereof and then said individually contoured lamination is attached to other individually contoured laminations using one of said selective bonding techniques.

18. The method as defined in claim 17 wherein said separation of said material which does not belong to said three-dimensional object is accomplished at each cycle of said three-dimensional object forming procedure by either positioning said platform in such a manner that pieces of said material surrounding said selectively bonded laminations have the ability to fall under the action of a gravity force as the material comprising them is cut by said lamination forming means, or by using an air suction or a magnetic force having the ability to move said pieces of said material surrounding said selectively bonded laminations away form other of said laminations.

19. The method as defined in claim 18 wherein a piece of transparent material or screen is positioned between said lamination forming means and said laminations during operation of said lamination forming means so that said pieces of material surrounding said selectively bonded laminations have the ability to fall or become attracted to said transparent material or said screen.

20. The method as defined in claim 18 wherein first, said lamination is bonded to other of said laminations by one of said selective bonding techniques and the material surrounding it is removed, and, next, the whole surface of said lamination is subjected to said one of said selective bonding techniques to complete attachment of said lamination to other of said laminations.

21. The method as defined in claim 18 wherein said electronic means is instructed to form a support structure simultaneously with sequential bonding and cutting of said laminations to form said three-dimensional object; said support structure being comprised of at least two stacks of laminations located on opposite sides of said three-dimensional object or a single stack surrounding it, and where said support structure is accomplished for an individual one of said laminations by leaving a lamination adjacent to said lamination uncut or cut only partially and stretched within said support structure; said support structure being separated from said three-dimensional object by mechanical or chemical etching means after forming said three-dimensional object.

22. The method as defined in claim 18 wherein said electronic means is instructed to laminate said three-dimensional object out of more than one material by either supplying different materials for different laminations or by supplying different materials for a single lamination; said materials which comprise a single lamination being attached to the adjacent lamination by sequentially performing said cutting and bonding for each of them followed by the removal of said materials surrounding said lamination.

23. The method as defined in claim 16 wherein said mask which is printed on said material comprising said laminations is printed by a color printer and said electronic means is instructed to print colors in correspondence to a color pattern of the surface of said three-dimensional object at coordinates corresponding to said individually contoured laminations and where at least a portion of said colored mask extends inside of said contour of said corresponding lamination.

24. A method of forming an integral three-dimensional object from laminations, comprising the steps of:
positioning a platform in proximity to means for forming a material into a plurality of individually contoured laminations and providing a support structure for said laminations;
providing electronic means for controlling the operation of said lamination forming and support structure providing means;
entering data representing the geometry of said three-dimensional object into said electronic means and thereafter instructing electronic means to manipulate said lamination forming and support structure providing means in a pre-selected sequence to perform sequential bonding and cutting of said laminations in precise registration to one another and to form a bonded support structure for said laminations, each of said individually contoured laminations representing a cross-section of said three-dimensional object; and
separating said individually contoured laminations from said support structure, obtaining as a result said three-dimensional object represented by one of said support structure and said individually contoured laminations;
at least some of said individually contoured laminations being formed after attachment of material comprising said individually contoured laminations to a stack thereof;
first, each said lamination being bonded to any other of said laminations using one of said selective bonding techniques; next, each said lamination being formed by cutting around its contour, preferably to the depth of one lamination, but said material surrounding it being left on said stack to support laminations that follow it, and where said surrounding material undergoes said separating step only after all of the laminations comprising said three-dimensional object have been sequentially bonded and cut; said lamination forming means being instructed to cut parting lines in said surrounding material in order to facilitate said separating step for separation of said surrounding material from said three-dimensional object after completing said sequential bonding and cutting of said laminations.

* * * * *